United States Patent
Aimi et al.

(10) Patent No.: US 9,420,168 B2
(45) Date of Patent: Aug. 16, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Masahiro Aimi, Kawasaki (JP); Toshihiro Mochizuki, Kawasaki (JP); Kenichi Murata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/488,927

(22) Filed: Sep. 17, 2014

(65) Prior Publication Data

US 2015/0085163 A1 Mar. 26, 2015

(30) Foreign Application Priority Data

Sep. 20, 2013 (JP) ................................ 2013-195318
Sep. 20, 2013 (JP) ................................ 2013-196070
Dec. 6, 2013 (JP) ................................ 2013-253638
Sep. 11, 2014 (JP) ................................ 2014-185700
Sep. 11, 2014 (JP) ................................ 2014-185701
Sep. 11, 2014 (JP) ................................ 2014-185702

(51) Int. Cl.
*H04N 5/232* (2006.01)
*G06K 9/00* (2006.01)
*H04N 5/262* (2006.01)

(52) U.S. Cl.
CPC ........ *H04N 5/23219* (2013.01); *G06K 9/00255* (2013.01); *H04N 5/2621* (2013.01)

(58) Field of Classification Search
CPC .................................................. H04N 5/2351
See application file for complete search history.

(56) References Cited

U.S. PATENT DOCUMENTS

| | | | | |
|---|---|---|---|---|
| 8,305,448 | B2 * | 11/2012 | Yoda | G06T 11/60 348/152 |
| 2014/0176663 | A1 * | 6/2014 | Cutler | H04N 7/142 348/14.07 |
| 2014/0243686 | A1 * | 8/2014 | Kimmel | A61B 5/1118 600/476 |

FOREIGN PATENT DOCUMENTS

JP 2011-022796 A 2/2011

OTHER PUBLICATIONS

Ren NG et al., "Light Field Photography with a Hand-Held Plenoptic Camera", Stanford University Computer Science Tech Report CTSR Feb. 2005 (8 pgs).
Todor Georgiev et al., "Superresolution with Plenoptic 2.0 Camera", 2009 Optical Society of America (3 pgs).

* cited by examiner

*Primary Examiner* — James Hannett
(74) *Attorney, Agent, or Firm* — Cowan, Liebowitz & Latman, P.C.

(57) ABSTRACT

An image processing apparatus obtains light field data, and selects a subject. The apparatus outputs restriction information which is information for not focusing on the selected subject, and is information for restricting reconstruction of the light field data.

30 Claims, 22 Drawing Sheets

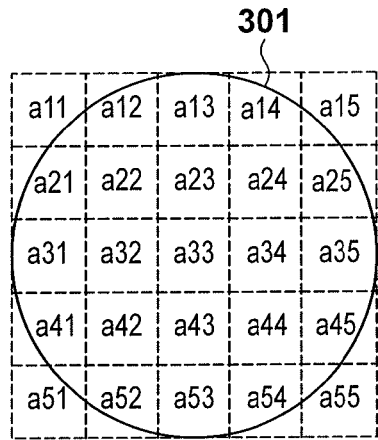
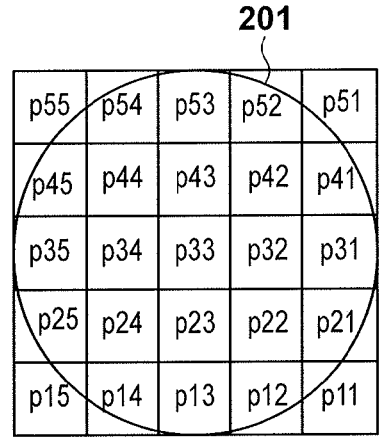
F I G. 4A    F I G. 4B
F I G. 5
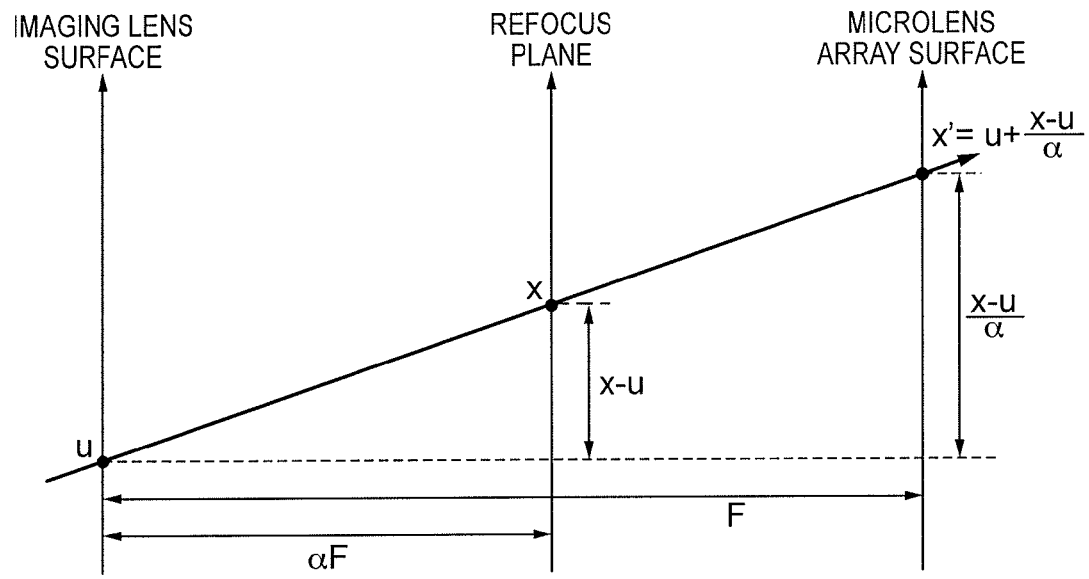

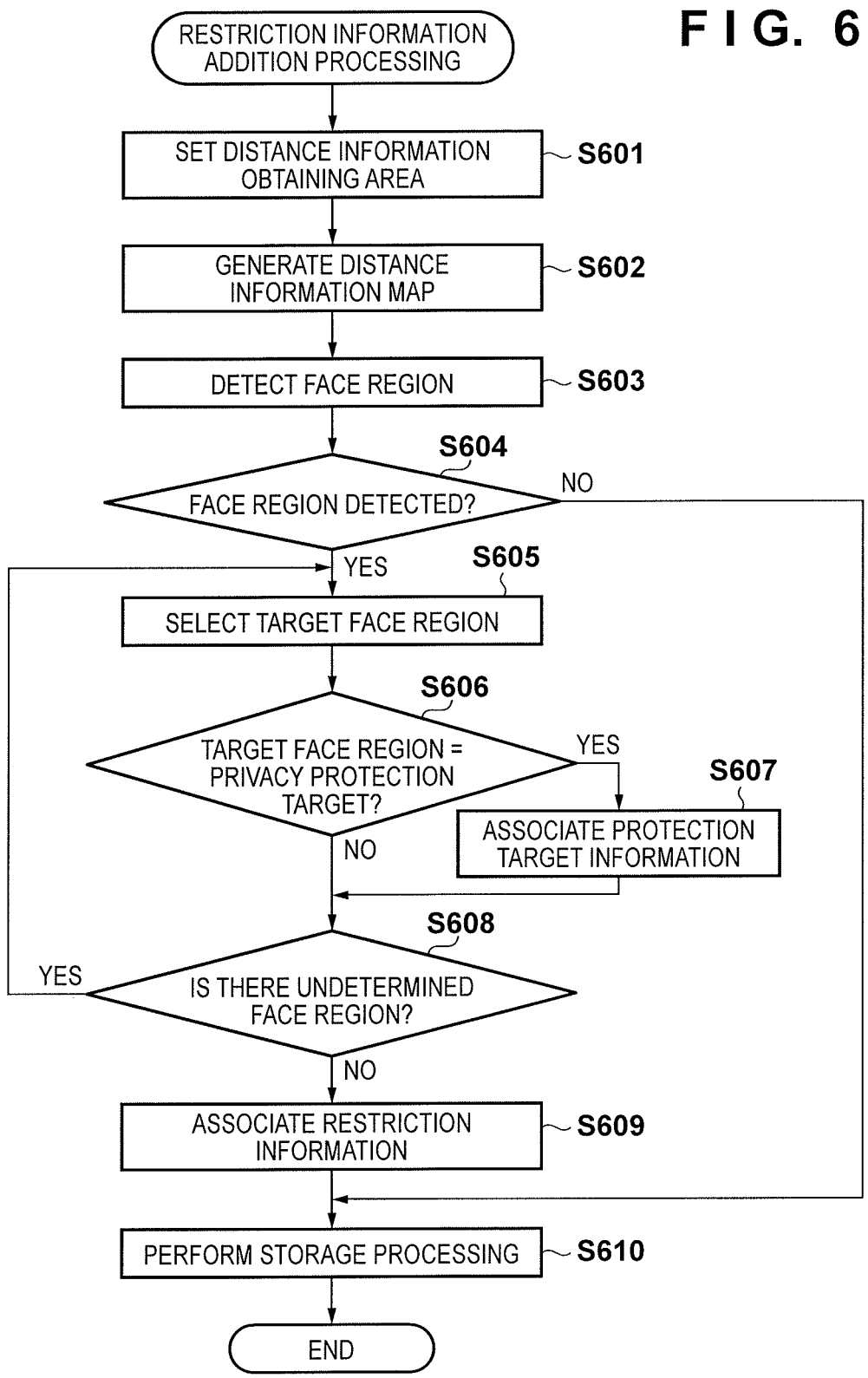

FIG. 9

| FACE ID | DISTANCE FROM DIGITAL CAMERA |
|---|---|
| A | 3m |
| B | 10m |
| C | 10m |

FIG. 10

| RESTRICTION INFORMATION | | |
|---|---|---|
| F-NUMBER | SUBJECT DISTANCE | |
|  | WIDE ANGLE SIDE | TELEPHOTO SIDE |
| 2 | 8m | 12m |
| 2.8 | 6m | 14m |
| 4 | 4.5m | 15.5m |
| 5.6 | 3.5m | 16.5m |

| | FOCUS POSITION | 3.5 m | 6 m | 10 m | 14 m | 16.5 m |
|---|---|---|---|---|---|---|
| F-NUMBER 2 | | ← BLUR TARGET RANGE → | | | | |
| | BLUR AMOUNT | NONE | SMALL | LARGE | SMALL | NONE |
| F-NUMBER 5.6 | | ← BLUR TARGET RANGE → | | | | |
| | BLUR AMOUNT | SMALL | MEDIUM | LARGE | MEDIUM | SMALL |

| F-NUMBER | SUBJECT DISTANCE |
|----------|------------------|
| 5.6 | 6m |

FIG. 24A

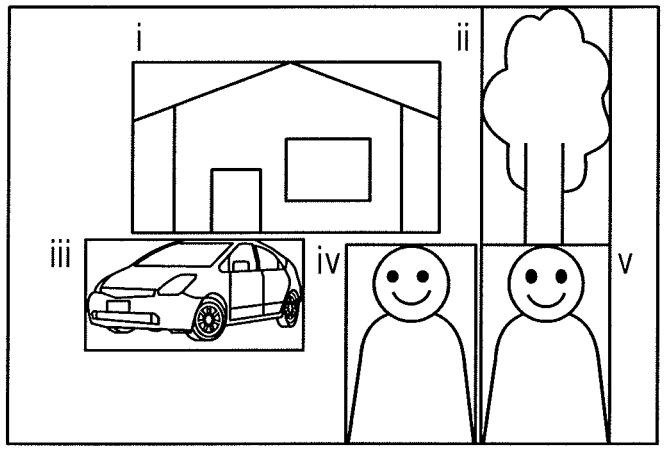

FIG. 24B

| No. | FROM IMAGING POSITION | |
|-----|----------|-------|
|     | DISTANCE | ANGLE |
| i   | 20m | -20° |
| ii  | 15m | 20°  |
| iii | 10m | -30° |
| iv  | 2m  | 10°  |
| v   | 2m  | 20°  |

FIG. 24C

| No. | IMAGE SENSING APPARATUS | |
|-----|----------|-------|
|     | LATITUDE | LONGITUDE |
| —   | NORTH LATITUDE 35°34'12.91" | EAST LONGITUDE 139°41' 7.28" |

FIG. 24D

| No. | SUBJECT | |
|-----|----------|-------|
|     | LATITUDE | LONGITUDE |
| i   | NORTH LATITUDE 35°34'13.43" | EAST LONGITUDE 139°41' 7.21" |
| ii  | NORTH LATITUDE 35°34'13.43" | EAST LONGITUDE 139°41' 7.5" |
| iii | NORTH LATITUDE 35°34'13.26" | EAST LONGITUDE 139°41' 7.13" |
| iv  | NORTH LATITUDE 35°34'12.99" | EAST LONGITUDE 139°41' 7.22" |
| v   | NORTH LATITUDE 35°34'13.99" | EAST LONGITUDE 139°41' 7.27" |

FIG. 25A
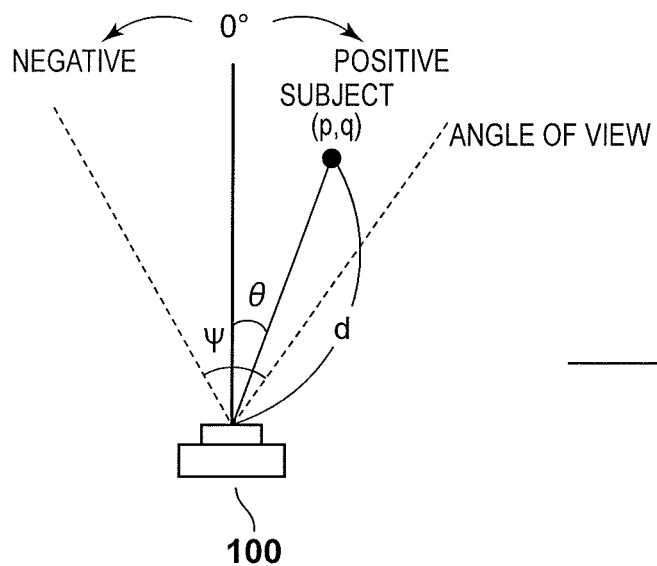
FIG. 25B
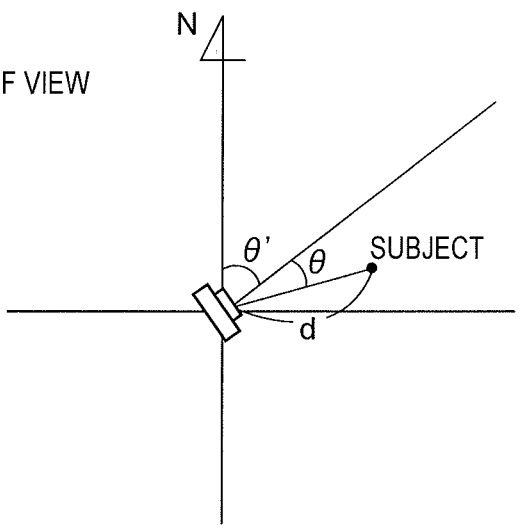
FIG. 26A
REFOCUS RESTRICTION REGION
| i | (x,y) |
|---|---|
FIG. 26B
REFOCUS RESTRICTION TABLE
| RESTRICTION INFORMATION TO i ||
|---|---|
| F-NUMBER | SUBJECT DISTANCE |
| 2 | 8m |
| 2.8 | 6m |
| 4 | 4.5m |
| 5.6 | 3.5m |
FIG. 26C
| F-NUMBER | SUBJECT DISTANCE |
|---|---|
| 5.6 | 5m |

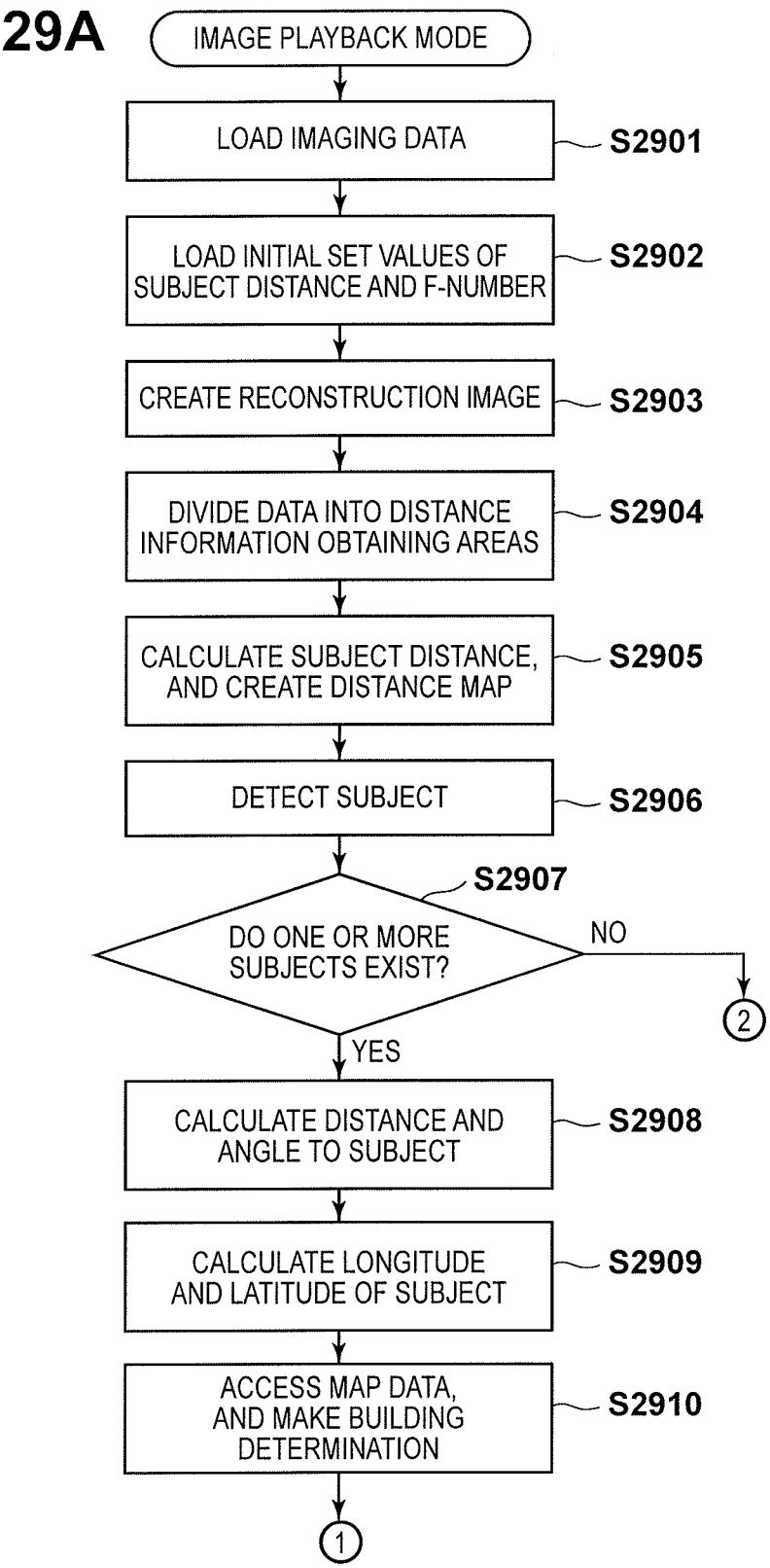

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, image processing method, and storage medium, and particularly to a technique of generating, from output data after imaging, reconstruction images.

2. Description of the Related Art

Recently, there has been proposed a technique of storing, as output data, the intensity distribution of light and the incident direction of light at the time of imaging in an image sensing apparatus such as a digital camera, thereby generating, for instance, from the output data after storage, an image focused on an arbitrary subject distance.

Ren.Ng, "Light Field Photography with a Hand-Held Plenoptic Camera", Stanford University Computer Science Tech Report CTSR 2005-02 discloses a method in which a microlens array is interposed between an imaging lens and an image sensor, and light fluxes incident from various directions are separated and stored by forming images of light fluxes having passed through different divided pupil regions of the imaging lens on the respective pixels (photoelectric conversion elements) of the image sensor through the microlens array. In the obtained output data (Light Field Data: to be referred to as LF data hereinafter), light fluxes incident from different directions are stored in adjacent pixels.

By extracting light fluxes in the same direction from pixels associated with respective microlenses, an image sensed from this direction can be generated from LF data. Also, a method called "Light Field Photography" is applied to set an arbitrary subject distance, and add outputs from pixels which store light fluxes having passed through respective points on a focal plane on which light fluxes from this subject distance converge. As a result, the pixels of an image focused on a specific subject distance can be pseudo-generated (reconstructed) after imaging.

However, reconstruction images focused on various subject distances, or reconstruction images from various viewpoints at a large depth can be generated from the above-mentioned LF data. Hence, privacy information falling within the imaging range may not be appropriately protected.

SUMMARY OF THE INVENTION

The present invention was made in view of such problems in the conventional technique. The present invention provides an image processing apparatus, image processing method, and storage medium for setting preferable reconstruction image generation conditions for an image signal capable of generating reconstruction images focused on a plurality of subject distances.

The present invention in its first aspect provides an image processing apparatus comprising: a data obtaining unit configured to obtain light field data; a selection unit configured to select a subject; and an output unit configured to output restriction information which is information for not focusing on the subject selected by the selection unit, and is information for restricting reconstruction of the light field data.

The present invention in its second aspect provides an image processing apparatus comprising: a signal obtaining unit configured to obtain light field data; an information obtaining unit configured to obtain restriction information for not focusing on a specific subject for a reconstruction image generable from the light field data; a setting unit configured to set a generation condition of a reconstruction image to be generated from the light field data; and a decision unit configured to decide, based on the generation condition set by the setting unit and the restriction information, a generation condition of a reconstruction image to be finally generated.

The present invention in its third aspect provides an image processing method comprising: a signal obtaining step of obtaining light field data; a selection step of selecting a subject; and an output step of outputting output restriction information for outputting restriction information which is information for not focusing on the subject selected in the selection step, and is information for restricting reconstruction of the light field data.

The present invention in its fourth aspect provides an image processing method comprising: a signal obtaining step of obtaining light field data capable of generating reconstruction images focused on a plurality of subject distances; an information obtaining step of obtaining restriction information for not focusing on a subject for a reconstruction image generable from the light field data; a setting step of setting a generation condition of a reconstruction image to be generated from the light field data; and a decision step of deciding, based on the generation condition set in the setting step and the restriction information, a generation condition of a reconstruction image to be finally generated.

The present invention in its fifth aspect provides an image processing apparatus comprising: a data obtaining unit configured to obtain light field data; a selection unit configured to select a subject; and an output unit configured to output restriction information which is information for making visibility of the subject selected by the selection unit, lower regardless of a generation condition in reconstructing, and is information about a reconstruction image generated by reconstructing the light field data.

The present invention in its sixth aspect provides an image processing apparatus comprising: a data obtaining unit configured to obtain light field data; an information obtaining unit configured to obtain restriction information for making visibility of a subject, lower regardless of a generation condition in reconstructing, for a reconstruction image generable from the light field data; a setting unit configured to set a generation condition of a reconstruction image to be generated from the light field data; and a decision unit configured to decide, based on the generation condition set by the setting unit and the restriction information, a generation condition of a reconstruction image to be finally generated.

Further features of the present invention will become apparent from the following description of exemplary embodiments (with reference to the attached drawings).

BRIEF DESCRIPTION OF THE DRAWINGS

FIGS. 4A and 4B are views showing the correspondence between the respective regions of the exit pupil 301, and photoelectric conversion elements associated with each microlens according to the embodiment of the present invention;

FIG. 5 is a graph for explaining the relationship between a light flux passing through a specific position on the reconstruction plane, and a position at which the light flux passes on the image sensing surface according to the embodiment of the present invention;

FIG. 6 is a flowchart exemplifying restriction information addition processing to be executed in the digital camera 100 according to the embodiment of the present invention;

FIG. 9 is a table exemplifying a relative distance table according to the embodiment of the present invention;

FIG. 10 is a table exemplifying restriction information according to the embodiment of the present invention;

FIGS. 24A, 24B, 24C, and 24D are views for explaining a detected subject, and the geographical position of the subject based on position information of an image sensing apparatus;

FIGS. 25A and 25B are views for explaining a method of calculating the relative position and geographical position of a subject;

FIGS. 26A, 26B, and 26C show an example of tables which hold refocus restriction information;

FIGS. 29A and 29B are flowcharts exemplifying playback processing to be executed in a digital camera 100 according to the fifth embodiment.

DESCRIPTION OF THE EMBODIMENTS

[First Embodiment]

An exemplary embodiment of the present invention will now be described in detail with reference to the accompanying drawings. An embodiment to be described below will explain an example in which the present invention is applied to, as an example of an image processing apparatus, a digital camera capable of generating, from LF data after imaging, an image focused on an arbitrary subject distance. However, the present invention is applicable to an arbitrary device capable of generating, from LF data, an image focused on an arbitrary subject distance.

In this specification, the following terms will be defined and explained.

"Light Field (LF) Data"

As an image signal output from an image sensing unit 106 of a digital camera 100 according to the embodiment, LF data is light field information describing a three-dimensional subject field. The respective pixels of the image signal represent signal strengths corresponding to light fluxes different in a combination of the incident direction, and a pupil region of an imaging optical system 104 through which the light flux has passed.

"Reconstruction Image"

An image which is newly generated by, for example, compositing pixels constituting LF data in a desired combination. In the embodiment, the reconstruction image includes an image which is generated from LF data and focused on (in-focus) an arbitrary subject distance. More specifically, the pixels of LF data are rearranged in accordance with the pixel arrangement on a focal plane (reconstruction plane, refocus plane) corresponding to a subject distance for generating an image. Then, the pixel values of a plurality of pixels (subpixels) of the LF data that correspond to one pixel (unit pixel) of a reconstruction image are added, thereby obtaining the pixel value of this pixel. The pixel arrangement on the reconstruction plane is decided based on the incident direction (incident angle) of a light flux incident when the image sensor exists on the reconstruction plane. One pixel of a reconstruction image can be generated by adding the pixel values of a plurality of pixels corresponding to one microlens in the pixel arrangement. In addition, the reconstruction image includes, for example, an image from each viewpoint generated from subpixels (subpixels having the same viewpoint) which exist for each microlens and have the same incident direction from the microlens. When generating the viewpoint image, an image from another viewpoint (incident direction from the microlens) may be aligned and added in consideration of a moving amount corresponding to the parallax.

<<Arrangement of Digital Camera 100>>

Figure 1:
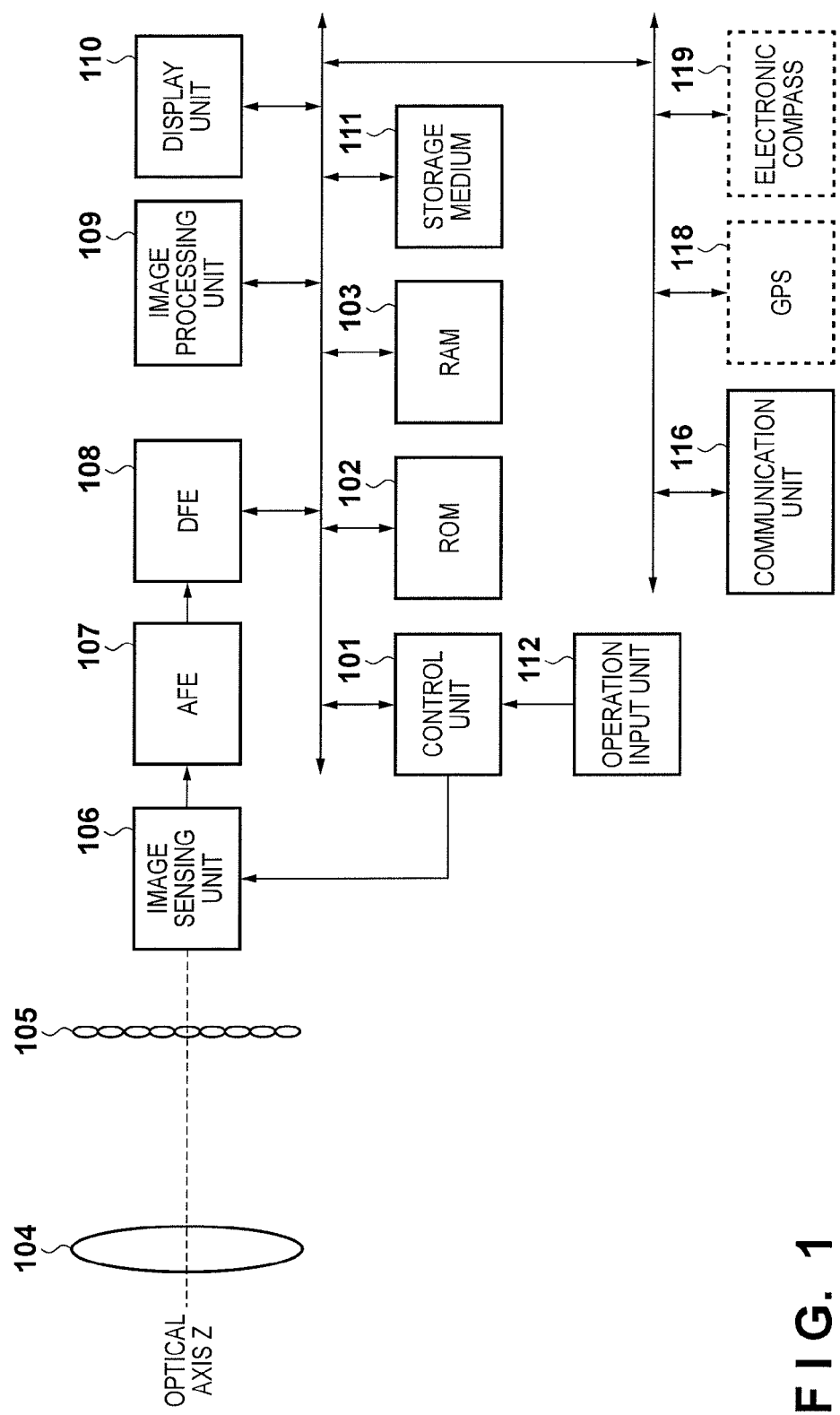
FIG. 1 is a block diagram showing the functional arrangement of a digital camera 100 according to an embodiment of the present invention.

FIG. 1 is a block diagram showing the functional arrangement of the digital camera 100 according to the embodiment of the present invention.

A control unit 101 is, for example, a CPU, and controls the operation of each block of the digital camera 100. More specifically, the control unit 101 controls the operation of each block by reading out the operation program of imaging processing or refocus moving image generation processing (to be described later) that is stored in a ROM 102, loading it into a RAM 103, and executing it.

The ROM 102 is, for example, a rewritable non-volatile memory, and stores parameters and the like necessary for the operation of each block, in addition to the operation program of each block of the digital camera 100.

The RAM 103 is a volatile memory. The RAM 103 is used not only as a loading area for the operation program of each block of the digital camera 100, but also as a storage area for storing intermediate data and the like output in the operation of each block.

The image sensing unit 106 is, for example, an image sensor such as a CCD or CMOS sensor. Upon receiving a timing signal output from a timing generator (TG: not shown) in accordance with an instruction from the control unit 101, the image sensing unit 106 photoelectrically converts an optical image formed on the photoelectric conversion element surface of the image sensor through the imaging optical system 104, and outputs an analog image signal. Note that the imaging optical system 104 includes, for example, an objective lens, focus lens, and stop. The digital camera 100 according to the embodiment includes a microlens array 105 between the imaging optical system 104 and the image sensor on the optical axis, in addition to microlenses arranged for the respective photoelectric conversion elements of the image sensor.

<Relationship between Microlens and Photoelectric Conversion Element>

The microlens array 105 interposed between the imaging optical system 104 and the image sensor on the optical axis in the digital camera 100 according to the embodiment will be described with reference to the accompanying drawings.

Figure 2:
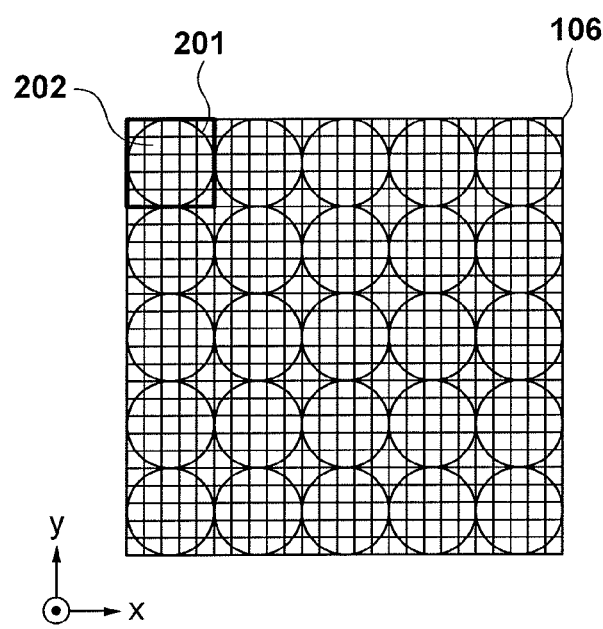
FIG. 2 is a view for explaining the relationship between a microlens array 105 and an image sensing unit 106 according to the embodiment of the present invention.

As shown in FIG. 2, the microlens array 105 according to the embodiment is constituted by a plurality of microlenses 201. In FIG. 2, the optical axis of the imaging optical system 104 is defined as the z-axis, the horizontal direction of the digital camera 100 at a landscape position is defined as the x-axis, and the vertical direction is defined as the y-axis. In the example of FIG. 2, the microlens array 105 is constituted by 5 (rows)×5 (columns) microlenses 201 for simplicity, but the arrangement of the microlens array 105 is not limited to this.

In FIG. 2, photoelectric conversion elements 202 of the image sensor constituting the image sensing unit 106 are illustrated as a matrix. A predetermined number of photoelectric conversion elements 202 are associated with each microlens 201. In the example of FIG. 2, the photoelectric conversion elements 202 of 5×5=25 pixels are associated with one microlens 201. Light fluxes having passed through one microlens 201 are separated in accordance with their incident directions, and form images on the corresponding photoelectric conversion elements 202.

Figure 3:
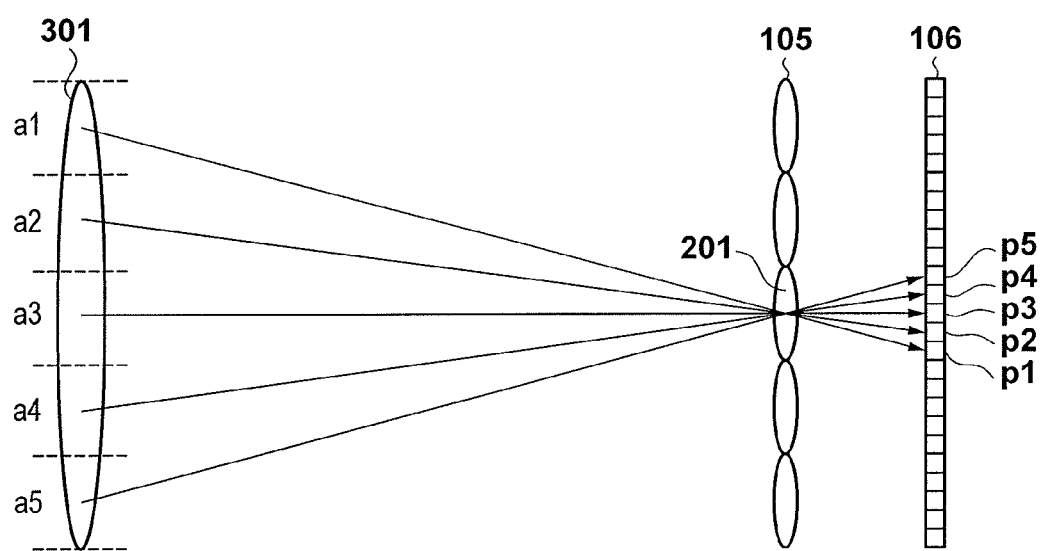
FIG. 3 is a view for explaining the relationship between a light flux having passed through each region of an exit pupil 301, and a photoelectric conversion element which photoelectrically converts the light flux according to the embodiment of the present invention.

FIG. 3 illustrates light fluxes entering photoelectric conversion elements $202p1$ to $202p5$ corresponding to one microlens 201. In FIG. 3, the upward direction corresponds to the upward vertical direction. FIG. 3 exemplifies the optical path of a light flux entering each photoelectric conversion element 202 when viewed from the lateral direction in a state in which the digital camera 100 is at a landscape position. As shown in FIG. 3, light fluxes having passed through regions a1 to a5 obtained by vertically dividing an exit pupil 301 of the imaging optical system 104 into five enter, through one microlens 201, the photoelectric conversion elements $202p1$ to $202p5$ arranged in the horizontal direction, respectively. Note that a numeral added to each region represents the correspondence between each region, and the photoelectric conversion element 202 which receives a light flux having passed through the region.

The example in FIG. 3 shows the optical path of a light flux entering each photoelectric conversion element 202 when viewed from the lateral direction. However, light fluxes are separated not only in the vertical direction, but also in the horizontal direction. More specifically, in a case in which the exit pupil 301 of the imaging optical system 104 is divided into regions as shown in FIG. 4A when viewed from the image sensor side, light fluxes having passed through the respective regions enter photoelectric conversion elements having the same identification numerals among the photoelectric conversion elements 202 as shown in FIG. 4B. Assume that the f-number of the imaging optical system 104 and that of each microlens of the microlens array 105 substantially coincide with each other.

An AFE (Analog Front End) 107 and DFE (Digital Front End) 108 perform correction processing and the like on an image signal generated by the image sensing unit 106. More specifically, the AFE 107 performs reference level adjustment (clamp processing) and A/D conversion processing on an analog image signal output from the image sensing unit 106, and outputs LF data to the DFE 108. The DFE 108 corrects a small reference level shift and the like for the input LF data.

An image processing unit 109 applies, to LF data having undergone correction processing by the DFE 108, various image processes such as white balance processing and color conversion processing, compression processing of compressing a formed image, composition processing of compositing a plurality of images, and the like. In the embodiment, the image processing unit 109 also performs processing of generating, from LF data, an image (reconstruction image) focused on an arbitrary subject distance. The reconstruction image can be generated using a "Light Field Photography" method as disclosed in Ren described above.

<Reconstruction Image Generation Method>

An outline of a method of generating a reconstruction image focused on a specific subject distance will be explained with reference to the accompanying drawings.

First, a subject distance on which a specific subject falling within an imaging range is focused can be obtained by the following method. First, the image processing unit 109 generates, from LF data, images corresponding to two light fluxes having passed through different divided pupil regions, and detects the difference (defocus amount) of the image of the specific subject between these images. Based on the detected defocus amount, the control unit 101 can calculate a subject distance to the specific subject.

In the example of FIG. 4B, for each microlens, an A image corresponding to the divided pupil region of the left half of the exit pupil 301 can be generated by adding the pixel values of pixels on the first and second columns, out of corresponding pixels. Also, a B image corresponding to the divided pupil region of the right half of the exit pupil 301 can be generated by adding the pixel values of pixels on the fourth and fifth columns, out of corresponding pixels. This is given by:

$$\sum_{a=1}^{5} \sum_{b=1}^{2} (p_{ab}) \quad (1)$$

$$\sum_{a=1}^{5} \sum_{b=4}^{5} (p_{ab}) \quad (2)$$

The obtained two types of reconstruction images are images having, as pseudo-optical axes, the barycentric positions of the corresponding divided pupil regions.

That is, the two types of reconstruction images have an image shift arising from an optical axis shift. By calculating the correlation between the two images, the image shift amount (pupil division phase difference) can be detected for each subject. The obtained image shift amount is multiplied by a conversion coefficient determined from the focus position of the imaging optical system 104 and the optical system. As a result, a subject distance for each subject falling within the imaging range of LF data can be analyzed. Based on the obtained subject distance, for example, a reconstruction image focused on a specific subject can be generated as an additional image.

Next, generation of a reconstruction image focused on a specific subject distance will be explained. In the digital camera 100 according to the embodiment, respective pixels assigned to one microlens receive light fluxes having passed through different divided pupil regions of the exit pupil of the imaging lens, as described above. This also applies to all the microlenses of the microlens array 105. Since light fluxes having passed through the imaging lens enter the respective microlenses from different directions, all the pixels of the image sensor receive light fluxes incident from different directions.

Each light flux will be defined and described by defining the optical path of a light flux entering each pixel of LF data obtained by imaging, by the coordinates (u, v) of a pupil region through which the light flux has passed within the exit pupil, and the position coordinates (x', y') of a corresponding microlens on the microlens array. In generation of a reconstruction image, a pixel value can be obtained by integrating a light flux having an optical path passing through the point of a pixel (x, y) for the pixel (x, y) on the reconstruction plane on which a light flux incident from a subject distance, at which a reconstruction image is generated, converges.

FIG. 5 shows the optical path of a light flux on a horizontal plane (x-z plane) when viewed from the vertical direction of the digital camera 100 at a landscape position. Although the optical path of a light flux passing through each pixel of the reconstruction plane on the x-z plane will be explained, this also applies to the y-z plane.

Letting (u, v) be the coordinates of the pupil region, and (x, y) be the coordinates of a pixel on the reconstruction plane, the position coordinates (x', y') of a microlens on the microlens array 105 that receives a light flux having passed through the divided pupil region and the pixel on the reconstruction plane are given by:

$$(x', y') = \left(u + \frac{x-u}{\alpha}, v + \frac{y-v}{\alpha}\right) \quad (3)$$

where F is the distance from the imaging lens to the microlens array, and αF is the distance from the imaging lens to the reconstruction plane (α is the refocus coefficient: a variable coefficient for deciding a distance to the reconstruction plane).

Letting L(x', y', u, v) be an output from a photoelectric conversion element which receives the light flux, a pixel output E(x, y) at the coordinates (x, y) of an image formed on the reconstruction plane is obtained by integrating L(x', y', u, v) with respect to the pupil region of the imaging lens, and is given by:

$$E(x, y) = \frac{1}{\alpha^2 F^2} \int \int L\left(u + \frac{x-u}{\alpha}, v + \frac{y-v}{\alpha}, u, v\right) du dv \quad (4)$$

This equation can be solved by simple addition by setting (u, v) as the representative coordinates of the pupil region.

A display unit 110 is a display device of the digital camera 100, such as a compact LCD. The display unit 110 is used to display the user interface screen of the digital camera 100, is used as an electronic viewfinder, or is used to display a sensed image. Also, the display unit 110 displays a reconstruction image which is generated and output by the image processing unit 109 and focused on an arbitrary subject distance. As described above, images are not linked between adjacent pixels in LF data obtained by A/D-converting analog image signals output from the image sensing unit 106 according to the embodiment. For this reason, the display unit 110 displays not LF data, but image data generated by the image processing unit 109.

A storage medium 111 is, for example, a built-in memory of the digital camera 100, or a storage device detachably connected to the digital camera 100, such as a memory card or HDD. The storage medium 111 stores LF data, and a reconstruction image which is generated from these LF data and focused on an arbitrary subject distance. Alternatively, a generated image or the like is transmitted (output) to an external apparatus (not shown) such as a personal computer via a communication unit 116.

An operation input unit 112 is a user interface of the digital camera 100, including a power button and shutter button. When the operation input unit 112 detects that the user has operated the user interface, it outputs a control signal corresponding to this operation to the control unit 101. For example, the operation input unit 112 outputs, to the control unit 101, various kinds of information about imaging such as the setting of an imaging mode. Signals output from a release switch are used as an AE or AF operation start trigger and an imaging start trigger. Upon receiving these start triggers, the control unit 101 controls the respective units of the image sensing apparatus such as the image sensing unit 106 and display unit 110.

In the description of the embodiment, processing of obtaining LF data by imaging processing and generating a reconstruction image is performed. However, LF data used for generation may be obtained from the storage medium 111 or via the communication unit 116.

<<Restriction Information Addition Processing>>

Processing regarding restriction of reconstruction, which is characteristic processing in the embodiment, will be explained. Since reconstruction images focused on various subject distances can be generated from the above-described LF data, privacy information falling within the imaging range may not be appropriately protected. That is, if a document or the like, imaging or copying of which is inhibited in general, falls within the imaging range, a reconstruction image in the document can be read may be generated. Recently, it is becoming popular to open an image obtained by imaging to an online image sharing service or the like. It is conceivable that LF data is opened in an arbitrarily reconstructable state. For example, as for a person unintentionally captured in the imaging range, the right of publicity may be infringed against the person's will, depending on the generation conditions of a reconstruction image from LF data. To prevent this, according to the embodiment, the presence of such a subject to be protected, and a refocus range in which the subject is focused on or visually perceptible are determined, and information for restricting refocusing on the refocus range (that is, on a plurality of generation conditions) is generated and outputted. The restriction information is added to LF data, is used for reconstructing in digital camera 100, or the like. Also, when a reconstruction image is generated not only for refocusing, but also for any other purpose such as a change of the viewpoint or a change of the perspective, restriction information for preventing reconstructing on the protection target or making its visibility lower (difficult to visually recognize the protection target) is added to LF data.

As for restriction information addition processing to be executed in the digital camera 100 having this arrangement according to the embodiment, detailed processing will be explained with reference to the flowchart of FIG. 6. Processing corresponding to this flowchart can be implemented by, for example, reading out a corresponding processing program stored in the ROM 102, loading it into the RAM 103, and executing it by the control unit 101. In the following description, the restriction information addition processing starts when, for example, imaging is performed using the digital camera 100.

In step S601, the control unit 101 sets, for LF data generated by imaging, distance information obtaining areas (to be referred to as D areas hereinafter) each for obtaining information of a distance to a subject. The D area represents a two-dimensional region in a pixel array constituting target LF data, which is defined for, as a unit, a pixel group (photoelectric conversion elements 202) assigned to the microlens 201. That is, the size of the D area is defined in accordance with the minimum resolution of a reconstruction image generable from LF data. In the example of FIG. 2, 5×5 pixels assigned to one microlens 201 are equivalent to the minimum resolution of a reconstruction image. Thus, the D area is defined as a region having pixels by multiples of 5 in the horizontal direction and pixels by multiples of 5 in the vertical direction.

Note that the D area may be set to be a proper size in accordance with restrictions such as the accuracy requested for a distance to a subject, the arithmetic capability of a device, the calculation amount, and a requested frame rate by using, as a unit, a pixel group equivalent to a minimum resolution generable from target LF data.

In step S602, the control unit 101 calculates, for each D area set in step S601, information of a representative distance to a subject falling in the area. More specifically, the control unit 101 controls the image processing unit 109 to generate, for each D area of the target LF data, two types of reconstruction images (detection images) for detecting a defocus amount, which correspond to light fluxes having passed through two different divided pupil regions. The detection images may correspond to light fluxes having passed through respective divided pupil regions obtained by dividing the region of the exit pupil 301 into divided pupil regions of left and right halves, as described above. However, the practice of the present invention is not limited to this. The detection images suffice to be images corresponding to light fluxes having passed through two types of divided pupil regions having different optical axes, out of light fluxes having passed through the exit pupil 301. The divided pupil region selection method is not limited to this. When one D area is constituted including pixel groups corresponding to a plurality of microlenses, the result of only a pixel group corresponding to a central microlens may be used as a representative. Alternatively, the average of distances obtained for pixel groups corresponding to the respective microlenses may be used.

The control unit 101 calculates the representative distance of each D area in accordance with the analysis result of the obtained defocus amount. Note that the representative distance may be a distance for a subject positioned at the center of each D area, or the average of distances obtained for subjects in the area.

Figure 7A:
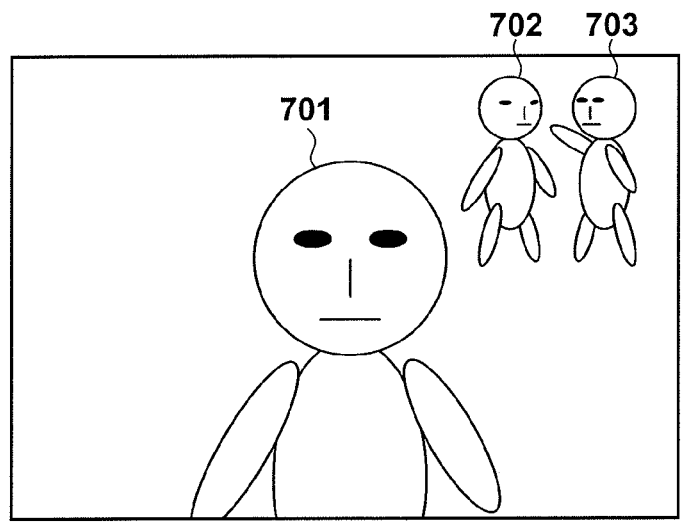
FIGS. 7A and 7B are views for explaining a distance information map according to the embodiment of the present invention.
Figure 7B:
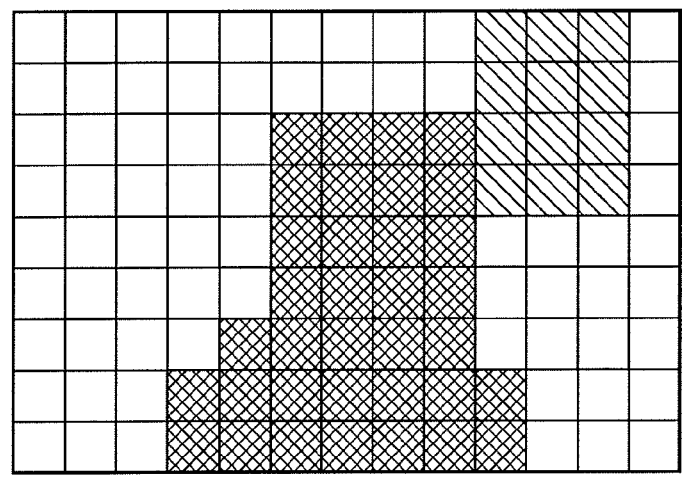

In the embodiment, the control unit 101 generates a distance information map corresponding to the imaging range of LF data by using information of the obtained representative distance of each D area. For example, when a reconstruction image as shown in FIG. 7A is generated using pixels of LF data that correspond to a central divided pupil region, out of pixels corresponding to the respective microlenses 201 so as to increase the depth of field, a distance information map as shown in FIG. 7B is generated. In the example of FIG. 7A, subjects 701, 702, and 703 exist in the imaging range. The distance information map in FIG. 7B represents, at a higher contrast (higher hatching density), a subject closer to the digital camera 100 at the time of imaging.

In step S603, the control unit 101 controls the image processing unit 109 to generate a reconstruction image having a large depth of field, as shown in FIG. 7A, and detects the face region of a person in the reconstruction image. In the following description of the embodiment, the face of a person among imaged subjects is detected as a specific subject, and the restriction of the generation conditions of a reconstruction image from LF data is decided based on the face region. However, the practice of the present invention is not limited to this. For example, a region having a specific feature in an image, such as a building, animal, or character, may be detected as a subject to be detected, and the restriction of the generation conditions may be decided in accordance with the detection result.

Figure 8:
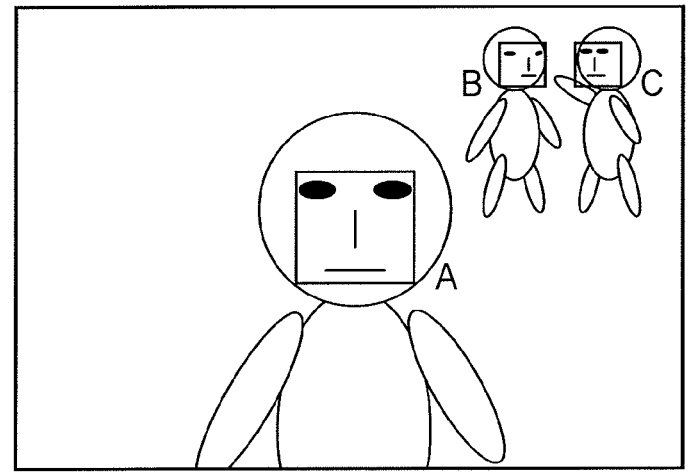
FIG. 8 is a view showing face regions detected in restriction information addition processing according to the embodiment of the present invention.

When face regions A, B, and C are detected in the detection image of FIG. 7A, as shown in FIG. 8, the control unit 101 assigns face IDs to the respective face regions in order to identify them. Further, the control unit 101 specifies subject distances for the respective face regions by referring to the distance information map, and manages the detected face regions by using a table (relative distance table) as shown in FIG. 9.

In step S604, the control unit 101 determines whether the face region has been detected in step S603. Restriction information addition processing according to the embodiment assumes that, only when the face region of a person is detected, LF data is stored together with restriction information serving as the restriction on the generation conditions of a reconstruction image. That is, the determination in this step is a determination condition of whether to associate restriction information. However, the practice of the present invention is not limited to detection of a face region, as described above, so the determination condition may be appropriately changed in accordance with the type of detected privacy information. If the control unit 101 determines that the face region has been detected, it shifts the process to step S605. If the control unit 101 determines that no face region has been detected, it shifts the process to step S610.

In step S605, the control unit 101 selects, as a determination target (target face region) from the detected face regions, one face region not having undergone the determination of whether the subject is a privacy protection target. That is, the control unit 101 selects, as a target face region, one face region for which determination of whether focusing on a subject in a reconstruction image is inhibited has not be executed.

In step S606, the control unit 101 determines whether the target face region is a privacy protection target. Whether the target face region is a privacy protection target may be determined based on, for example, the following criteria.

<Privacy Protection Target Determination Criteria>

(1) Face Region Size Criterion

For example, a face region having a largest size, out of detected face regions, may be detected, and some or all remaining face regions may be determined as privacy protection targets. That is, a face region imaged to become largest is highly likely to have been imaged as a main subject by the user. Thus, the remaining face regions may be regarded as the face regions of persons almost unrelated to the user, and may be set as privacy protection targets.

(2) Face Region Position Criterion

For example, a face region arranged at a position closest to the center in a detection image, out of detected face regions, may be detected, and some or all remaining face regions may be determined as privacy protection targets. That is, a face region imaged to be captured at the center is highly likely to be imaged as a main subject by the user. Hence, the remaining face regions may be regarded as the face regions of persons almost unrelated to the user, and may be set as privacy protection targets.

(3) Recognition Target Face Region Criterion

For example, the face region of a person registered in advance as a recognition target, out of detected face regions, may be detected, and the remaining face regions may be determined as privacy protection targets. That is, when the face of a person is set in advance as a recognition target, it is considered that the relationship between the user and the person is guaranteed. Thus, face regions which have not been recognized may be set as privacy protection targets.

(4) Main Subject Category Criterion

For example, when a target selected as a main subject in accordance with the setting of an imaging mode or the like is a landscape or the like, all the face regions of persons may be determined as privacy protection targets. That is, the target is not limited to the face of a person. When the category (for example, person, landscape, or building) of a target selected as a main subject is determined in advance, images belonging to other categories may be set as privacy protection targets.

(5) User Selection

As described above, the control unit 101 may determine a privacy protection target by referring to a preset criterion, and also determine, as a privacy protection target, a subject selected with, for example, the operation button (not shown) of the digital camera 100. Alternatively, subjects other than a selected subject may be determined as privacy protection targets.

(6) Character String Criterion

For example, when a reconstruction image is generated and contains a character string in a visually recognizable state, such as the license plate of a car or an address, all the regions of such character strings may be determined as privacy protection targets. Determination of a character string may use a well-known OCR (Optical Character Recognition) technique or the like.

Based on such a determination criterion, the control unit 101 determines a target face region in this step. If the control unit 101 determines that the target face region is a privacy protection target, it shifts the process to step S607. If the control unit 101 determines that the target face region is not a protection target, it shifts the process to step S608.

In step S607, the control unit 101 associates the target face region in, for example, the relative distance table with information representing that this target face region is a privacy protection target. The control unit 101 then shifts the process to step S608.

In step S608, the control unit 101 determines whether there is a face region not selected yet as a target face region. If the control unit 101 determines that there is a face region not selected yet as a target face region, it returns the process to step S605. If the control unit 101 determines that there is no such face region, it shifts the process to step S609.

In step S609, by referring to the subject distance of a face region (protection face region) associated with the information representing that the face region is a privacy protection target, the control unit 101 associates, as restriction information with LF data, the generation conditions of a reconstruction image focused on the protection face region. For example, when the face regions B and C are determined as protection face regions in the example of FIG. 8, the control unit 101 sets, in restriction information as generation conditions for suppressing setting, the generation conditions of a reconstruction image which includes the subject distance "10 m" of these face regions in the depth of field. The depth of field changes depending on a pseudo-f-number in a reconstruction image, that is, the degree of limitation of a divided pupil region corresponding to pixels used to generate a reconstruction image. For this reason, the range of generation conditions in which a protection face region may fall within the depth of field is generated as a table as shown in FIG. 10 in correspondence with a pseudo-f-number settable in generation of a reconstruction image. This table is associated as restriction information with LF data.

As shown in FIG. 10, when a pixel corresponding to a light flux having passed through a pupil region corresponding to a large stop aperture (small f-number), that is, a wide range is used to generate a reconstruction image, the depth of field is small, and thus the range of the subject distance at which settings are restricted becomes narrow. To the contrary, when a pixel corresponding to a light flux having passed through a pupil region corresponding to a small stop aperture (large f-number), that is, a narrow range is used to generate a reconstruction image, the depth of field is large, so the range of the subject distance at which settings are restricted becomes wide.

In the description of the embodiment, the depth of field is grasped in advance for each generation condition of a reconstruction image generable from LF data, and restriction information is generated in accordance with the subject distance of the protection face region. However, the practice of the present invention is not limited to this. For example, the range of the subject distance serving as restriction information may be set not based on whether a subject falls within a focusable range at the depth of field, but based on whether a protection face region is detected as a face region within the depth of field. That is, the settings of the generation conditions may be restricted on the assumption that a protection face region can be recognized even if a reconstruction image is out of focus and is in a so-called "blurred" state.

In step S610, the control unit 101 stores the LF data in the storage medium 111, and terminates the restriction information addition processing.

By this processing, in the digital camera 100 according to the embodiment, the generation conditions of a reconstruction image in which a subject serving as a privacy protection target can be identified can be associated as restriction information with LF data.

<<Playback Processing>>

Figure 11:
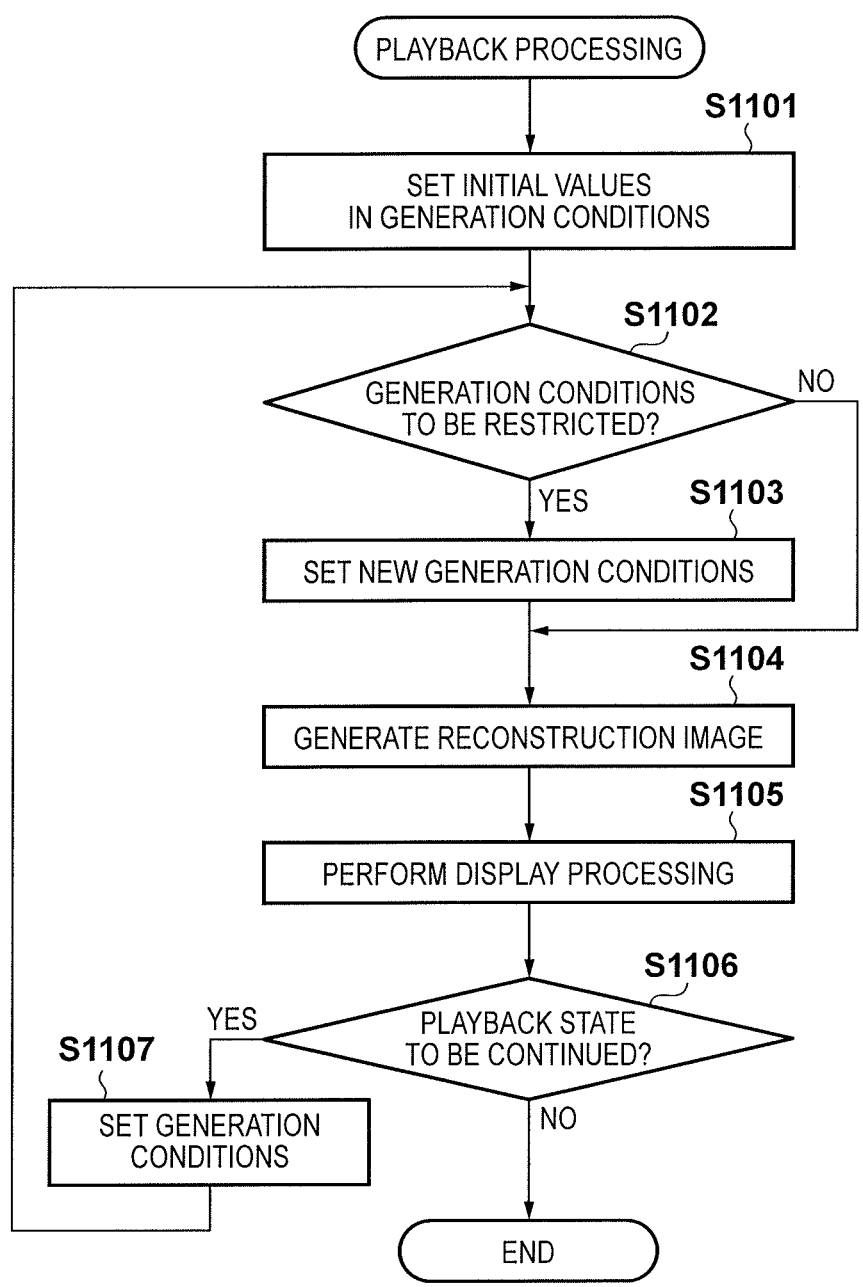
FIG. 11 is a flowchart exemplifying playback processing to be executed in the digital camera 100 according to the embodiment of the present invention.

Next, playback processing of playing back LF data stored together with restriction information in the above-described manner while generating a reconstruction image will be explained in detail with reference to the flowchart of FIG. 11. Processing corresponding to this flowchart can be implemented by, for example, reading out a corresponding processing program stored in the ROM 102, loading it into the RAM 103, and executing it by the control unit 101. In the following description, the playback processing starts when, for example, the user issues an LF data (target LF data) viewing instruction.

In step S1101, the control unit 101 reads out information of the initial values (a focus position or focusing subject distance, and a pseudo-f-number) of the generation conditions of a reconstruction image that have been set in advance for generation of target LF data. Then, the control unit 101 sets the initial values as generation conditions. The initial values of the generation conditions may be, for example, predetermined fixed values regardless of LF data stored in the ROM 102, or values specific to LF data decided by, for example, conditions at the time of imaging that are stored in association with each LF data. As the reconstruction image, the embodiment will exemplify a reconstruction image refocused on a specific subject distance (reconstruction plane). However, the reconstruction image is not limited to this, and a plurality of reconstruction methods are conceivable such that an image from a specific viewpoint is generated as a reconstruction image, as described above.

In step S1102, the control unit 101 determines whether the generation conditions set in step S1101 are generation conditions restricted for the target LF data. More specifically, the control unit 101 determines whether restriction information is associated with the target LF data. If restriction information is associated with the target LF data, the control unit 101 determines whether generation conditions restricted by the restriction information include the set generation conditions. If the control unit 101 determines that the set generation conditions are generation conditions restricted for the target LF data, it shifts the process to step S1103. If the control unit 101 determines that the set generation conditions are unrestricted generation conditions, it shifts the process to step S1104.

In step S1103, the control unit 101 sets, as new generation conditions of a reconstruction image, the generation conditions not restricted by the restriction information. More specifically, the control unit 101 refers to information of the range of a subject distance which is associated with the f-number of a currently set generation condition and at which reconstructing is restricted. Then, the control unit 101 sets, as the subject distance of a new generation condition, a subject distance which is the boundary value of the range and is closest to the subject distance of a currently set generation condition. For example, when restriction information is one as shown in FIG. 10, and currently set generation conditions are a pseudo-f-number of 5.6 and a subject distance of 8 m, 3.5 m is set as the subject distance of a closest boundary value.

When the range of a subject distance at which reconstructing is restricted covers the entire range of a subject distance settable as a generation condition, an f-number small next to the current f-number may be selected as a pseudo-f-number.

In step S1104, the image processing unit 109 generates a reconstruction image from the target LF data in accordance with the set generation conditions under the control of the control unit 101.

In step S1105, the control unit 101 controls the display unit 110 to display the reconstruction image generated by the image processing unit 109.

In step S1106, the control unit 101 determines whether the playback state of the target LF data, that is, the state in which a reconstruction image is generated from the target LF data and played back continues. That is, the control unit 101 determines whether the user has issued an instruction to return from the state regarding viewing of the target LF data. If the control unit 101 determines that the playback state of the target LF data continues, it shifts the process to step S1107. If the control unit 101 determines that the playback state of the target LF data does not continue, it terminates the playback processing.

If a change of the generation conditions of the reconstruction image have been made, the control unit 101 changes the generation conditions in step S1107, and returns the process to step S1102.

Hence, when playing back LF data, generation of a reconstruction image in which privacy information can be identified can be prevented by referring to restriction information.

Figure 12:
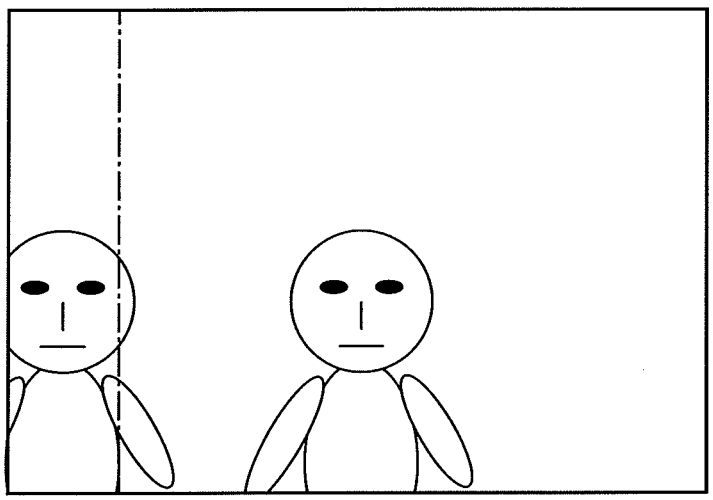
FIG. 12 is a view showing an example of a reconstruction image generated in the digital camera 100 according to the embodiment of the present invention.

In the description of the embodiment, when the generation condition of a reconstruction image coincides with a restricted generation condition, the generation condition is changed to the boundary value of a restricted subject distance. However, the practice of the present invention is not limited to this. For example, as a generation condition after change, not a boundary value, but a value which falls outside the range and is as close as possible to a set value before change may be selected. Also, for example, when a privacy protection target subject exists in the range of a predetermined subject distance from a subject desired to be set as a main subject in imaging, a region excluding the privacy protection target subject may be generated as a reconstruction image, as shown in FIG. 12. That is, when the focusing state of a subject which is preferably in focus, and the focusing state of privacy information cannot be made different in a reconstruction image, the imaging range (image region) for performing reconstructing may be limited so that the reconstruction image does not include the privacy information. Even such imaging range information can be established as restriction information. When the generation condition of a reconstruction image coincides with a restricted generation condition, the user may be simply notified that reconstruction is inhibited, so as not to perform reconstruction processing.

The embodiment has exemplified restriction information addition processing and playback processing, and has explained addition of restriction information to LF data and playback of the LF data to which the restriction information is added. However, the practice of the present invention can be implemented unless restriction information is added to LF data at the time of imaging. That is, for example, even if no restriction information is added to LF data, the presence/absence of privacy information may be determined to limit generation conditions at the time of playing back LF data. A generation condition to be restricted may be determined by hardware or software such as an application not only when storing LF data generated by imaging, but also when registering LF data generated by imaging by the digital camera 100 in an information processing apparatus such as a PC. This determination may be made by an upload application or an arbitrary configuration on a server at the time of uploading to a photograph sharing server such as a SNS.

As described above, the image processing apparatus according to the embodiment can set a preferably reconstructable range for an image signal capable of generating a reconstruction image focused on a specific subject distance.

[Second Embodiment]

The procedures of imaging processing, and the procedures of restriction information addition processing to obtained imaging data (LF data) according to the second embodiment will be described.

<Image Processing Information Addition Processing>

Figure 15:
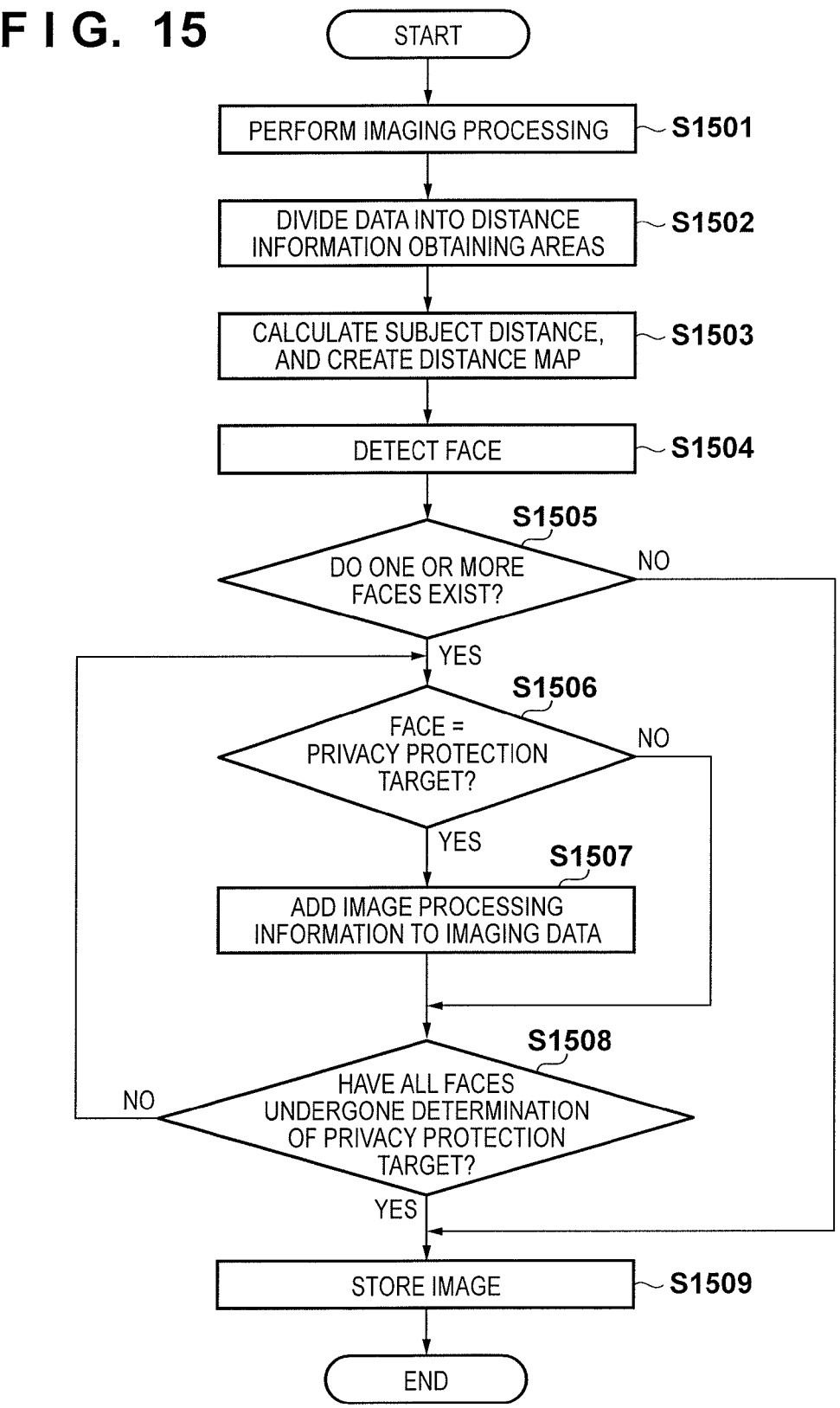
FIG. 15 is a flowchart exemplifying restriction information addition processing to be executed in a digital camera 100 according to the second embodiment.

Image processing information addition processing will be explained with reference to the flowchart of FIG. 15. Processing of each sequence is performed by a control unit 101, or each unit in FIG. 1 in accordance with an instruction from the control unit 101. This processing may always be performed when normal imaging processing is executed, or may be performed when transmitting LF data obtained by imaging to, for example, an external apparatus. When adding image processing information in transmitting LF data obtained by imaging to an external apparatus, after a request to transmit LF data to the external apparatus is output, LF data which has already been obtained by imaging and stored in a memory may be read out to perform processes in step S1502 and subsequent steps.

First, in step S1501, if an imaging instruction is issued by an operation to the operation input unit 112, imaging processing is performed to obtain imaging data (LF data). At this time, imaging may be performed in a state in which a desired subject is focused on by focusing by driving a focusing lens included in an imaging optical system 104 in advance. An image sensing unit 106 may obtain an imaging signal before an imaging instruction, and control operations such as exposure control by analyzing an image, subject (face) detection, and white balance control may be performed.

Then, in step S1502, the input imaging data is divided into predetermined D areas.

In step S1503, the control unit 101 applies the above-described expressions (1) and (2) to the imaging data divided into D areas, and calculates subject distances which represent the respective D areas. A distance information map is constituted by pieces of obtained subject distance information for the respective D areas.

In step S1504, an image processing unit 109 performs face detection and face recognition in an image shown in FIG. 7A. In face recognition, a face is detected as the face of a specific person, unlike face detection in which it is detected that a subject is likely to be a face. As the face recognition processing method, face recognition may be performed by further detecting a specific feature from a face region detected by face detection.

When three faces are detected, as in FIG. 8, face recognition is performed for each face, and a face ID and a distance (subject distance) from a digital camera 100 are obtained. The subject distance is obtained using the distance map in FIG. 7B. The face ID and subject distance obtained in this fashion are numbered and stored as a detected-face relative distance table, as in FIG. 9.

In step S1505, it is determined whether one or more faces have been detected in step S1504. If one or more faces have been detected, the process advances to step S1506. If no face has been detected, the process advances to step S1509 to save the image. Then, the process ends.

In step S1506, it is determined whether at least one of the faces detected in step S1504 is a privacy protection target. If it is determined that the face is a privacy protection target, the process advances to step S1507. If it is determined that the face is not a privacy protection target, the process advances to step S1508. The algorithm to determine whether a face is a privacy protection target may be the same as that in the first embodiment.

Figures 16, 17:
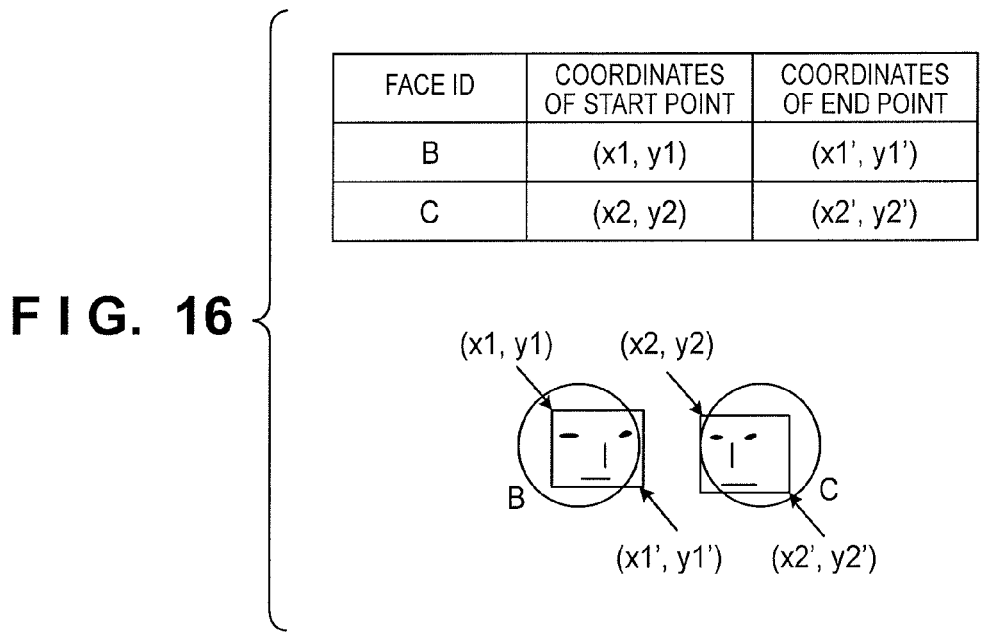
FIG. 16 is a view for explaining a privacy information protection region according to the second embodiment.
FIG. 17 is a table for explaining an image processing information table according to the second embodiment.

In step S1507, the image processing unit 109 adds image processing information to the imaging data. More specifically, if it is determined that B and C in FIG. 8 are privacy protection targets, a blur amount by which the faces B and C in FIG. 8 are not detected is calculated and added. Although a detailed calculation method will be described later, position information of a privacy protection region shown in FIG. 16, and an image processing information table shown in FIG. 17 are added to imaging data. For example, the start points (x1, y1) and (x2, y2) and end points (x1', y1') and (x2', y2') (FIG. 17) of the coordinates of the face frames B and C in FIG. 8 are stored as pieces of position information of subjects serving as privacy protection regions. In the image processing information table of FIG. 17, a blur amount to be applied to a privacy protection region is held for each f-number (depth of field) and each focus position (subject distance). For example, assume that the subject distance (in-focus position) for B and C in FIG. 8 is determined to be 10 m based on the distance map of FIG. 7B, and at an f-number of 2, the faces B and C can be identified at a subject distance of 6 m to 14 m. This range is blurred by image processing for privacy protection. Considering this, the blur amount is applied until it becomes impossible to identify the target. Thus, the blur amount changes depending on the subject distance. For example, at a subject distance of 10 m at which the privacy protection targets exist, as represented by the upper side of FIG. 17, the targets can be identified unless they are largely blurred, so the blur amount is increased. In contrast, subject distances of 6 m and 14 m deviate from the subject distance of the targets. In this case, even if the targets are not largely blurred, they cannot be recognized, so the blur amount is decreased. In this way, for a subject distance range in which it is assumed that a privacy protection target is satisfactorily recognized, the blur amount is obtained and stored in the image processing information table. At an f-number of 5.6, the depth of field is increased, the faces B and C can be recognized at a larger subject distance of 3.5 m to 16.5 m, and thus this range is blurred. The blur amount in this case is large at a subject distance of 10 m, small at subject distances of 3.5 m and 16.5 m, and intermediate at subject distances of 6 m and 14 m, as represented by the lower side of FIG. 17.

In the above-described example, processing for generating the reconstruction image has been described as refocus processing of a target reconstruction image to which image processing information is added. However, the present invention is not limited to this. Since the depth of field becomes large in a reconstruction image generated mainly using subpixels corresponding to some incident directions (pupil regions) for a change of the viewpoint, it is preferable to set information for applying blur processing by a large blur amount. Note that the method of changing the blur amount can be implemented by changing, for example, the characteristic of a Gaussian filter. More specifically, three types of cutoff frequencies for the spatial frequency of an image are set, and filter coefficients corresponding to the respective cutoff frequencies are stored in a memory. When the blur amount is small, blur processing is performed using a filter coefficient of a characteristic in which the cutoff frequency is highest. When the blur amount is large, blur processing is performed using a filter coefficient of a characteristic in which the cutoff frequency is lowest. Similarly, when the blur amount is medium, blur processing is performed using a filter coefficient of a characteristic in which the cutoff frequency takes an intermediate band. In this fashion, the blur amount can be adjusted. The embodiment has exemplified blur processing as processing to be applied to a privacy protection target region. However, the present invention is not limited to this, and various methods are conceivable as image processing for privacy protection, including mask processing of replacement with a predetermined image, and processing of changing the value of a luminance signal or color signal to inhibit recognition of a target.

In step S1508, it is determined whether all faces managed in the face information table of FIG. 9 have undergone determination of a privacy protection target. If there is a face not having undergone the determination yet, the process returns to step S1506 to repeat processing. If all faces have undergone the determination, the process advances to step S1509.

Finally, in step S1509, the imaging data (LF data), the privacy protection information in FIG. 16, and the image processing information table in FIG. 17 are associated with each other and stored in a storage medium 111. If necessary, for example, flag information which defines execution of protection processing on the privacy protection region of the imaging data by using protection information of privacy protection may be added to read out the flag at the time of playing back the imaging data.

<Playback Processing>

Figure 18:
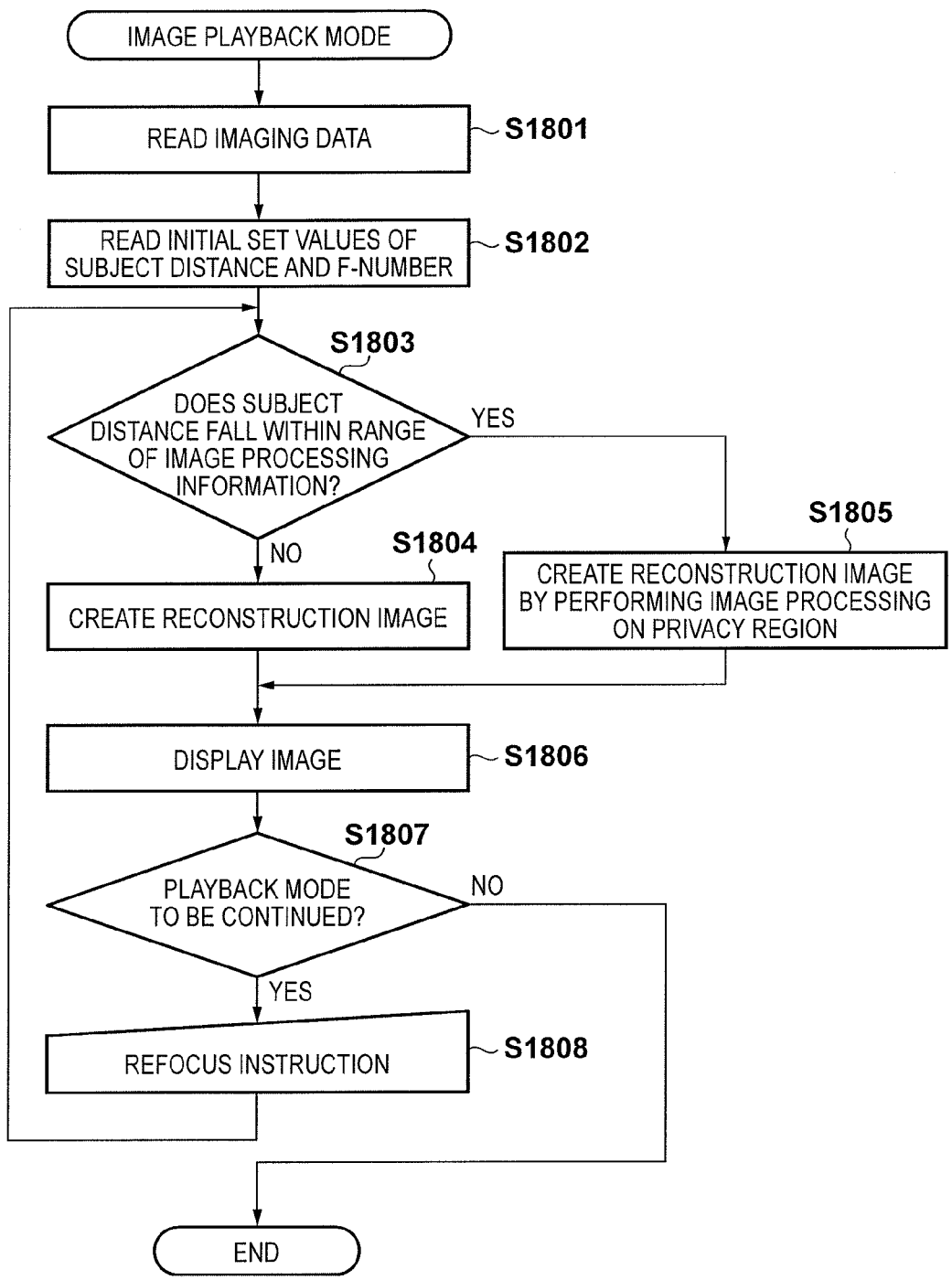
FIG. 18 is a flowchart exemplifying playback processing to be executed in the digital camera 100 according to the second embodiment.

Next, procedures to perform processing of protecting privacy information by using image processing information at the time of image playback will be described with reference to the flowchart of FIG. 18. The explanation will be made by exemplifying procedures to play back imaging data to which the privacy protection region in FIG. 16 and the image processing information table in FIG. 17 are added, which have been described in the image processing information addition procedures.

First, in step S1801, if an image playback instruction is issued by operating an operation input unit 112, imaging data (LF data) is read from the storage medium 111 and temporarily held in a RAM 103.

Then, in step S1802, the initial set values of the subject distance and f-number of the imaging data are read from the RAM 103. The LF data makes it possible to reconstruct an image on an arbitrary subject distance within a refocusable range. For this reason, when displaying an image, the initial values of the subject distance and f-number need to be set. In the embodiment, information of whether a subject satisfying a specific condition has been detected, and information of a region where a detected subject exists in the imaging data are read out from header information associated with the imaging data. It is also conceivable to detect a representative subject at the time of obtaining LF data, and set the subject distance to a position at which the subject exists. Since the position of the focus lens at the time of imaging has been known in advance, this position may be set as the subject distance, but is not limited in this idea.

In step S1803, it is determined whether a subject distance corresponding to an f-number represented by the initial set value read in step S1802 falls within the range of a subject distance which is described in the image processing information table, and at which privacy protection processing should be applied to a predetermined range in the image. If the subject distance does not fall within the range in the image processing information table, the process advances to step S1804 to generate a reconstruction image based on the set values. If the subject distance falls within the range in the image processing information table, the process advances to step S1805. In the embodiment, a subject distance of 6 m, which is an initial set value in FIG. 19, falls within a range "f-number of 5.6 and subject distance of 3.5 m to 16.5 m", which is a blur target range defined by the image processing information table of FIG. 17. Thus, the process advances to step S1805.

In step S1805, the image processing unit 109 (protection image generation unit) generates an image (protection image) by blurring, by a blur amount described in the image processing information table, a privacy protection target face falling within the range of the subject distance included in the image processing information table. In the embodiment, the faces B and C fall within the range of the image processing information table in FIG. 17. Therefore, the privacy protection regions of the faces B and C shown in FIG. 16 are set using a blur amount stored in the image processing information of FIG. 17, thereby generating a blurred image. Since the initial set values are an f-number of 5.6 and a subject distance of 6 m, a blurred image in the blur amount "medium" in FIG. 17 is generated.

Figures 19, 20:
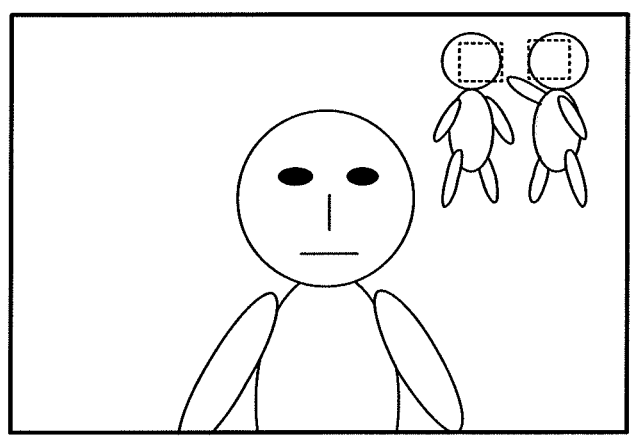
FIG. 19 is a table for explaining a refocus initial set value according to the second embodiment.
FIG. 20 is a view for explaining a reconstruction image after image processing according to the second embodiment.

Assume that a reconstruction image shown in FIG. 20 is generated by the above-described processing. In FIG. 20, regions surrounded by dotted lines are replaced with the blurred images described above.

By performing this processing, only a privacy protection region can be blurred by an appropriate blur amount, creating a privacy-protected image, as shown in FIG. 20.

Thereafter, in step S1806, a display unit 110 displays the image created in step S1804 or S1805.

Finally, in step S1807, it is determined whether to continue the playback mode. If it is determined to continue the playback mode, a refocus instruction is waited in step S1808. If it is determined to end the playback mode, the operation in the image playback mode ends.

The preferred embodiments of the present invention have been described. However, the present invention is not limited to these embodiments, and can be variously modified and changed without departing from the spirit of the invention.

According to the embodiment, in step S1803, it is determined based on the database exemplified in FIG. 17 whether the subject distance falls within the range of a subject distance at which blur processing should be applied to a predetermined range in the image. If necessary, protection processing is applied to the privacy region by blur processing or the like. However, the present invention is not limited to this, and blur processing or mask processing may be always performed as privacy protection processing on regions (regions B and C in FIG. 16) in an image that are determined to be privacy protection targets, regardless of the subject distance.

For example, the embodiment has mainly explained a face as a subject. However, the subject is not limited to a face. An embodiment is conceivable, in which the database of in-focus inhibition subjects is created on the Internet, and blur processing is performed on subjects registered in the database. Various modifications are possible. In this case, the image processing unit 109 needs to include a database used to detect registered in-focus inhibition subjects, and a registered in-focus inhibition subject needs to be detected in advance using LF data.

It is readily conceivable that only a main subject can be highlighted by adding image processing information (blur processing) to the entire range except for the main subject. Various modifications and changes are possible without departing from the spirit of the invention.

[Third Embodiment]

Figure 21:
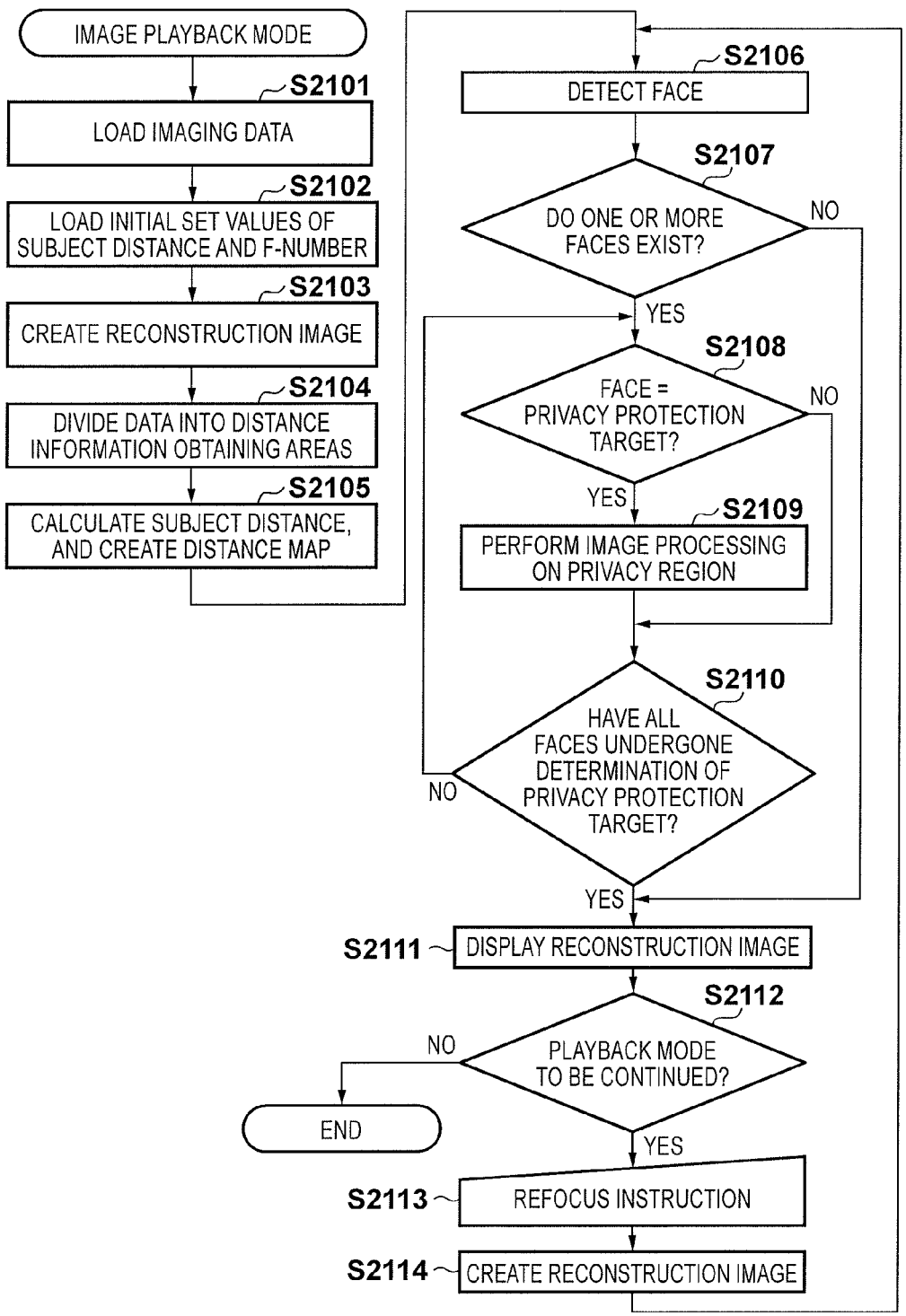
FIG. 21 is a flowchart exemplifying playback processing to be executed in a digital camera 100 according to the third embodiment.

In the third embodiment of the present invention, at the time of image playback, privacy protection processing is performed on imaging data (LF data) in which image processing information has not been added to a privacy protection region or blur processing has not been performed. Then, an image is displayed. FIG. 21 is a flowchart showing the procedures of privacy protection processing at the time of image playback according to the third embodiment.

First, in step S2101, imaging data stored in a storage medium 111 is loaded. At this time, a light field image may be obtained from an external device by using a communication unit 116, and the imaging data reading method is not limited. In step S2101, an image sensing unit 106 may sense an image to output LF data.

Processing in step S2102 is the same that in step S1802 according to the second embodiment, and a description thereof will not be repeated.

In step S2103, a reconstruction image is created based on a subject distance and f-number read in step S2102.

Processing of creating a distance information map and performing face detection in steps S2104 to S2106 is the same as that in steps S1502 to S1504 according to the second embodiment, and a description thereof will not be repeated.

In step S2107, it is determined whether one or more faces have been detected in step S2106. If one or more faces have been detected, the process advances to step S2108. If no face has been detected, the process advances to step S2113 to display a reconstruction image on a display unit 110.

Processing in step S2108 is the same that in step S1506 according to the second embodiment, and a description thereof will not be repeated.

In step S2109, image processing (blur processing) for privacy protection is performed on a privacy protection region to create an image in which the privacy protection target cannot be satisfactorily recognized. A corresponding region of the reconstruction image is overwritten with the created image.

Processing in step S2110 is the same as that in step S1508 according to the second embodiment, and a description thereof will not be repeated.

In step S2111, the display unit 110 displays the reconstruction image. Alternatively, in step S2111, the reconstruction image is transmitted via the communication unit 116 in accordance with a user operation or a request from an external apparatus. For example, when uploading an image to a SNS by using LF data, the user may generate a reconstruction image having undergone privacy protection processing, and transmit it to a server serving as an external apparatus. Alternatively, upon receiving a request from an external apparatus to transmit reconstruction image data obtained from LF data in a digital camera 100, the digital camera 100 may start the processing of this flowchart.

Finally, in step S2112, it is determined whether to continue the playback mode. If it is determined to continue the playback mode, a refocus instruction is waited in step S2113. If it is determined to end the playback mode, the operation in the image playback mode ends. If a refocus instruction is issued in step S2113, a reconstruction image is created based on designated set values in step S2114. The process then returns to step S2106 to repeat the processing.

In the third embodiment, the digital camera 100 associates privacy protection information with imaging data and stores them. Even at the time of playback, the digital camera 100 performs protection processing based on privacy protection information. However, the present invention is not limited to this. An image processing system may be built, in which another image processing apparatus reads stored imaging data and protection information, performs protection processing on the imaging data, and plays back the resultant imaging data.

In the third embodiment, so-called LF data is obtained as imaging data by imaging or the like, and when generating a reconstruction image from the LF data, protection processing is performed. However, the present invention is applicable to even image data obtained from an image sensing apparatus which senses not LF data, but image data obtained by a normal image sensor (for example, pixels below the same microlens in the image sensor according to the embodiment are added into a unit pixel).

The preferred embodiments of the present invention have been described. However, the present invention is not limited to these embodiments, and can be variously modified and changed without departing from the spirit of the invention.

For example, information (for example, the face or address of the user of a playback apparatus) already registered on the playback apparatus side, out of privacy protection information, may be excluded from privacy protection targets and displayed without performing blur processing.

[Fourth Embodiment]

An exemplary embodiment of the present invention will be described in detail with reference to the accompanying drawings.

<<Arrangement of Digital Camera 100>>

A digital camera 100 according to the fourth embodiment basically has the same arrangement as that of the digital camera 100 according to each of the first to third embodiments described above. In addition, the digital camera 100 according to the fourth embodiment further includes the following components indicated by broken lines in FIG. 1.

A GPS 118 receives pieces of information successively transmitted from a GPS satellite, and calculates the longitude and latitude of the present location. An electronic compass 119 detects geomagnetism, and calculates a direction in which the digital camera 100 is oriented at the time of imaging.

<Restriction Information Addition Processing>

Processing regarding restriction of reconstructing, which is characteristic processing in the embodiment, will be explained.

Figure 22:
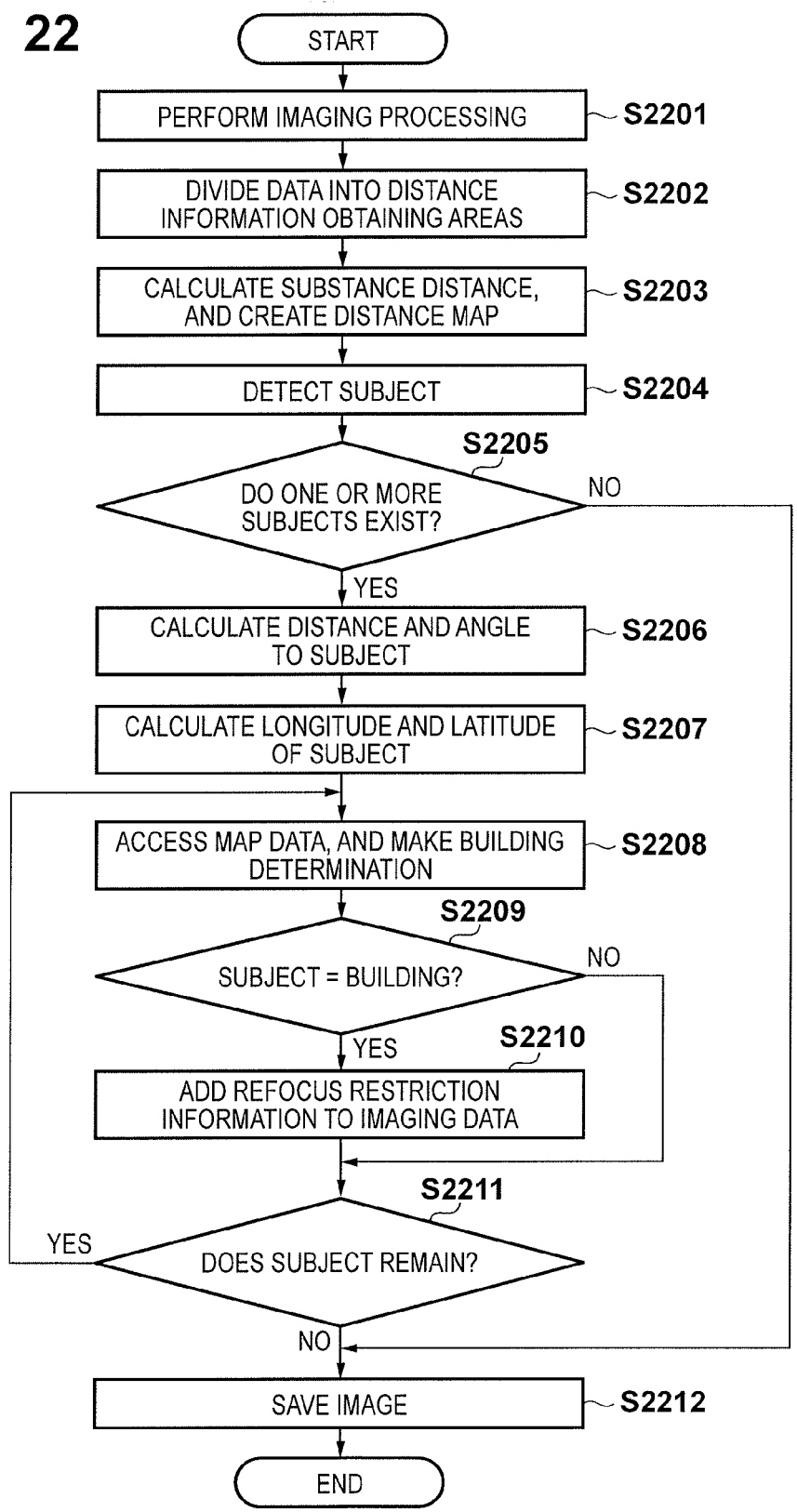
FIG. 22 is a flowchart exemplifying restriction information addition processing to be executed in a digital camera 100 according to the fourth embodiment.

FIG. 22 is a flowchart showing restriction information addition processing according to the fourth embodiment. Processing corresponding to this flowchart can be implemented by, for example, reading out a corresponding processing program stored in a ROM 102, loading it into a RAM 103, and executing it by a control unit 101. In the following description, the restriction information addition processing starts when, for example, imaging is performed using the digital camera 100. In step S2201, if an imaging instruction is issued by operating an operation input unit 112, imaging processing is performed to obtain imaging data.

Then, in step S2202, D areas are set in the input imaging data.

In step S2203, the above-described expressions (1) and (2) are applied to the imaging data in which the D areas are set, and subject distances which represent the respective D areas are calculated. A distance information map is constituted by pieces of obtained subject distance information for the respective D areas.

Figure 23A:
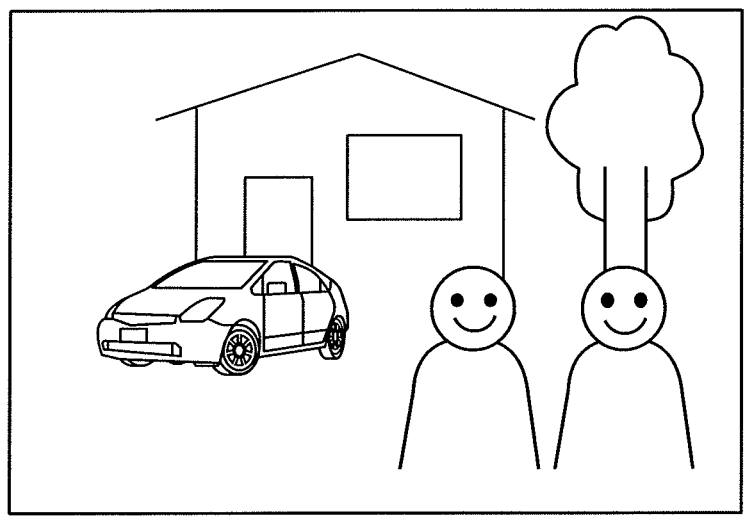
FIGS. 23A and 23B are views for explaining a subject and subject distance information.
Figure 23B:
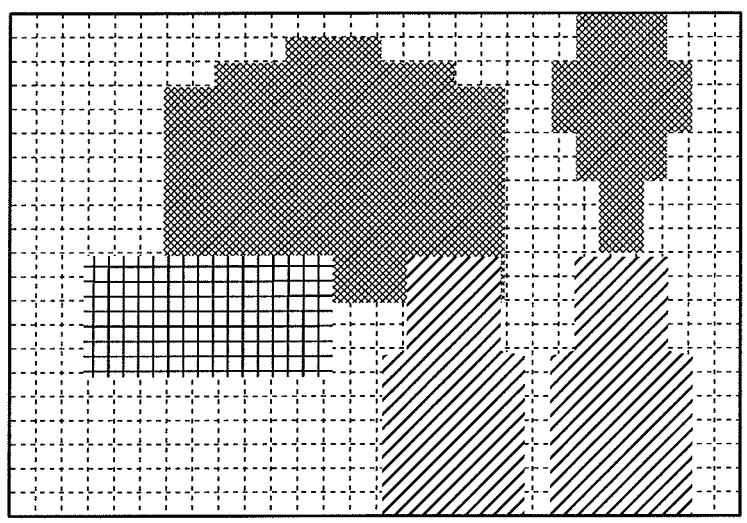

Assume that an image shown in FIG. 23A is sensed, and a distance information map shown in FIG. 23B is obtained. The distance information map expresses the difference in subject distance by the contrast.

In step S2204, subjects are detected from the image in FIG. 23A. More specifically, subjects are detected by extracting, from the distance information map in FIG. 23B, boundary lines at which the subject distance abruptly changes. At this time, the boundary line may also be set by referring to edge information, color information, and the like near the boundary. If subjects are detected, they are numbered and stored, as shown in FIG. 24A.

Then, in step S2205, it is determined whether one or more subjects have been detected in step S2204. If one or more subjects have been detected, the process advances to step S2206. If no subject has been detected, the process advances to step S2212 to save the image. Then, the process ends.

In step S2206, the distance and angle to each subject detected in step S2205 are calculated. More specifically, the representative point of each subject is decided. The representative point may be a point near the center of each subject, or a point having a shortest distance in the range of each subject. The representative point is not limited. As for the distance to the representative point of a subject, the subject distance has been calculated in step S2203, and the distance of a D area containing the representative point is referred to. The angle of each subject will be explained with reference to FIG. 25A. FIG. 25A shows the horizontal angle of view of the digital camera 100. The optical axis direction is defined as 0°, the right side is represented by a positive angle, and the left side is represented by a negative angle. Although the detailed calculation method will be described later, the angle θ takes a positive value in this case. The calculated distance d and angle θ to the representative point are stored in a subject relative position table shown in FIG. 24B in association with the numbered subject information.

In step S2207, a longitude and latitude indicating the geographical position of each subject are calculated. More specifically, first, the longitude and latitude of the imaging location are obtained from the GPS 118. Assume that a longitude and latitude shown in FIG. 24C are obtained. Then, a direction in which the digital camera 100 is oriented is obtained from the electronic compass 119. As a result, an angle θ' in FIG. 25B is obtained. In step S2206, it is known that a subject exists in the direction of the angle θ from the optical axis direction of the digital camera 100. It is therefore known that a subject exists at the position of the distance d in the direction of the azimuth (θ'+θ) from the digital camera 100. From these pieces of information, the longitude and latitude of the subject can be obtained by calculation. As the detailed calculation method, various methods have been proposed, including a method of calculating a longitude and latitude by conversion into a rectangular plane coordinate system. This method is regarded as a known technique, and a description thereof will be omitted. The calculated longitude and latitude of the subject are stored in a subject longitude/latitude table shown in FIG. 24D, in association with the numbered subject information. The longitude/latitude information may be temporarily saved, and after the end of the sequence, discarded. Alternatively, the longitude/latitude information may be kept stored together with imaging data in association with subject information.

In step S2208, longitudes and latitudes stored in the subject longitude/latitude table are transmitted sequentially from i to a map database on the Internet via a communication unit 116. Note that the map database is a database in which subject information of a building or the like and position information representing the longitude and latitude are held in association with each other. Since recent car navigation systems and the like hold the locations and types of buildings, the map can also be displayed three-dimensionally. By using the map database, it can be determined whether a building exists at the longitude and latitude. The digital camera 100 receives, from the map database via the communication unit 116, whether a building exists at the longitude and latitude.

If a building exists at the longitude and latitude in step S2209, the process advances to step S2210. If no building exists, the process advances to step S2211.

In step S2210, the control unit 101 adds refocus restriction information to the imaging data. More specifically, if it is determined that i in FIG. 24A is a building, a set value at which i in FIG. 24A falls outside the depth of field is calculated and added. Although the detailed calculation method will be described later, a refocus restriction region and refocus restriction table shown in FIGS. 26A and 26B are added to the imaging data. For example, the coordinates (x, y) of the representative point of i in FIG. 24A are stored in the refocus restriction region. A subject distance settable for each f-number is stored in the refocus restriction table of FIG. 26B. For example, when the f-number is 2, the depth of field becomes small, and if the subject distance becomes larger than 8 m, i falls within the depth of field. Thus, the restriction is imposed to prevent reconstructing at more than this subject distance. To the contrary, when the f-number is 5.6, the depth of field becomes large, and if the subject distance becomes larger than 3.5 m, i falls within the depth of field. Thus, the restriction is imposed to prevent reconstructing at more than this subject distance.

In step S2211, it is determined whether all subjects managed in the subject longitude/latitude table of FIG. 24D have undergone the building determination. If there is a subject not having undergone the building determination, the process returns to step S2208 to repeat the processing. If all subjects have undergone the building determination, the process advances to step S2212.

Finally, in step S2212, the imaging data is stored in a storage medium 111. Also, the refocus restriction region and refocus restriction table in FIGS. 26A and 26B are stored in the storage medium 111 in association with the imaging data.

The series of refocus restriction information addition procedures has been described.

Next, the method of calculating an angle to a subject, which has been described in step S2206, will be explained with reference to FIG. 25A.

Let ψ be the horizontal angle of view of the digital camera 100, and (p, q) be the coordinates of the pixel position of a representative point indicating the position of a subject in imaging data. The coordinates of the pixel position define the position of a microlens 201 on a microlens array 105 that serves as the minimum position resolution of a generated reconstruction image. The horizontal angle ψ of view of the digital camera 100 is decided at the time of imaging. Letting (P, Q) be the total number of the microlenses of the microlens array 105, the angle θ of the subject can be obtained by:

$$\theta = -\psi/2 + (\psi/P) \cdot p \tag{5}$$

A table which summarizes these results for respective subjects is the subject relative position table in FIG. 24B.

Note that the calculation method has been described in a case in which the digital camera 100 is held at a so-called landscape position and senses an image. When the digital camera 100 is held at a so-called portrait position and senses an image, it is readily conceivable that calculation is performed using the vertical angle of view of the digital camera 100, the coordinate q, and the total number Q of pixel arrays.

Next, the method of calculating a set value at which building i in FIG. 24A falls outside the depth of field, which has been described in step S2210, will be described in detail.

The depth of field can be generally calculated by:

$$D1 = (\delta \cdot F1 \cdot a2)/(f2 - \delta \cdot F1 \cdot a) \tag{6}$$

$$D2 = (\delta \cdot F2 \cdot a2)/(f2 + \delta \cdot F2 \cdot a) \tag{7}$$

where "D1" is the rear depth of field, "D2" is the front depth of field, "δ" is the diameter of the permissible circle of confusion representing a range in which the spread of an optical image is permitted, "F1" and "F2" are the f-numbers, "f" is the focal length of the lens, and "a" is the subject distance.

It is known that the depth of field includes the front depth of field and the rear depth of field, as described above. A subject falling outside the depth of field is out of focus and looks blurred. The purpose of this idea is not to focus on unintentionally captured privacy information. In most cases, unintentional information is captured back. It is reasonable to set a small rear depth of field so as not to focus on privacy information. Therefore, the rear depth of field will be explained.

Although the rear depth of field is given by equation (6), the focal length f of the lens is decided at the time of imaging. The diameter δ of the permissible circle of confusion is a value decided by the designer, and a value of about 1/1000 of the diagonal length of the image sensing unit 106 is generally used. Letting A be the distance to building i in FIG. 24A, building i falls outside the rear depth of field by satisfying the following relation (8) (in the embodiment, A=20 from the subject relative position table):

$$D1+a<A \tag{8}$$

By solving equation (6) and relation (8), the subject distance a at which building i falls outside the depth of field can be calculated for each f-number F1. The refocus restriction table in FIG. 26B summarizes this result.

<Playback Processing>

Figure 27:
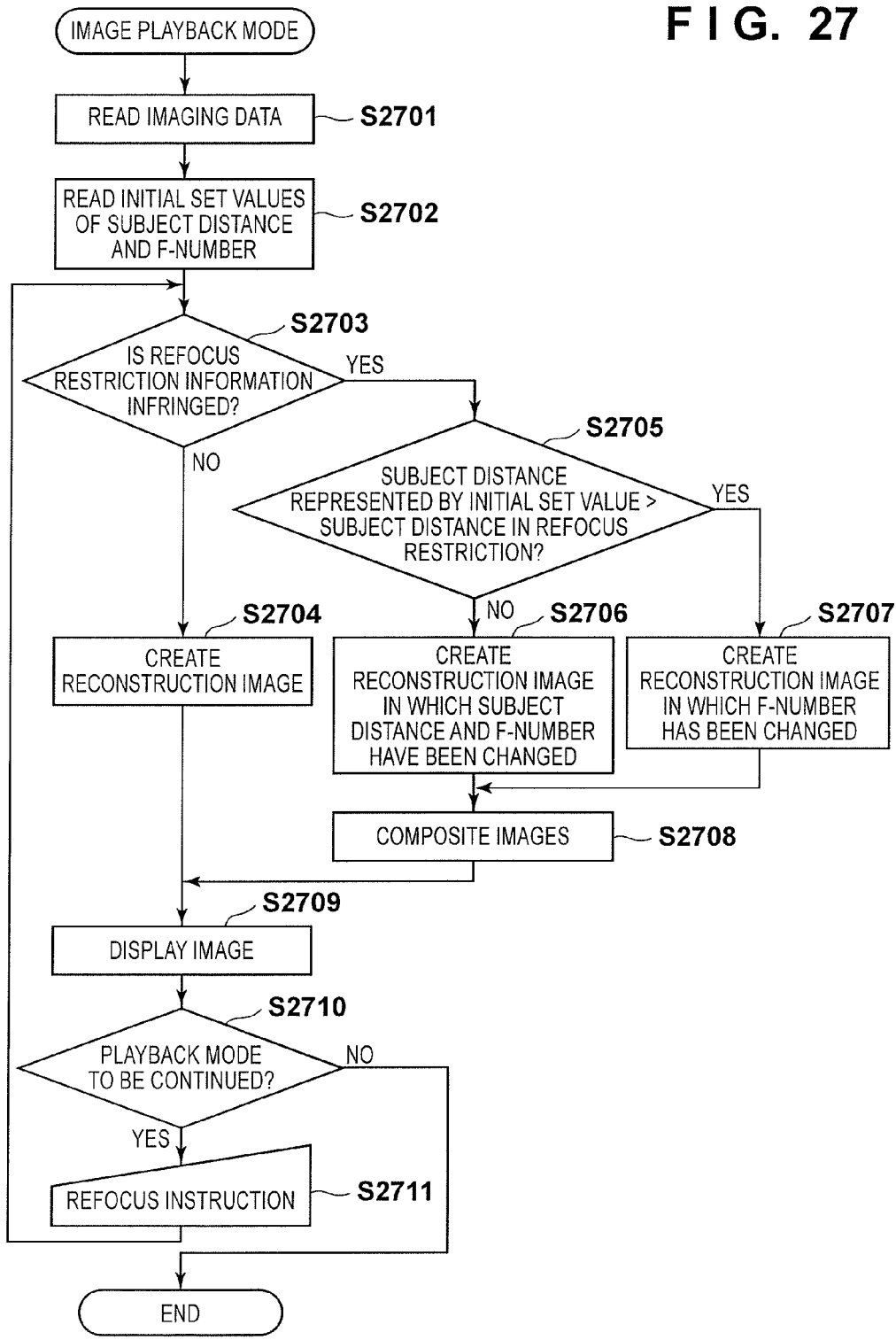
FIG. 27 is a flowchart exemplifying playback processing to be executed in a digital camera 100 according to the fourth embodiment.

Next, procedures to restrict the refocus range and perform reconstructing by using refocus restriction information at the time of image playback will be explained with reference to the flowchart of FIG. 27. The explanation will be made by exemplifying procedures to play back imaging data (LF data) to which the reconstruction restriction region in FIG. 26A and the reconstruction restriction table in FIG. 26B are added, which have been described in restriction information addition processing. Processing corresponding to this flowchart can be implemented by, for example, reading out a corresponding processing program stored in the ROM 102, loading it into the RAM 103, and executing it by the control unit 101. In the following description, the playback processing starts when, for example, the user issues an LF data (target LF data) viewing instruction.

First, in step S2701, if an image playback instruction is issued by operating the operation input unit 112, LF data is read from the storage medium 111 and temporarily stored in the RAM 103.

Then, in step S2702, the initial set values of the subject distance and pseudo-f-number of the LF data, and restriction information, which are associated with the LF data, are read from the RAM 103. In the embodiment, the user can also add restriction information at the time of image playback. In this case, a subject is set by designating it by the user via the operation input unit 112 using a displayed reconstruction image or the like. That is, if there is restriction information set at the time of playback, the restriction information is obtained in step S2702. In general, the LF data does not have the format of data for display without any change, and needs to be reconstructed into the format of an image for display. In order to generate a reconstruction image focused on a predetermined subject distance, the initial values of the subject distance and f-number need to be set. If no initial value has been stored in the RAM 103, a representative subject may be detected to set the subject distance at a position where the subject exists. Alternatively, a subject distance corresponding to the position of the focus lens at the time of imaging may be set. In the embodiment, the setting of the subject distance is not limited. If an image already reconstructed in association with LF data at the time of storage exists as an initial image, it may be used.

Figure 28A:
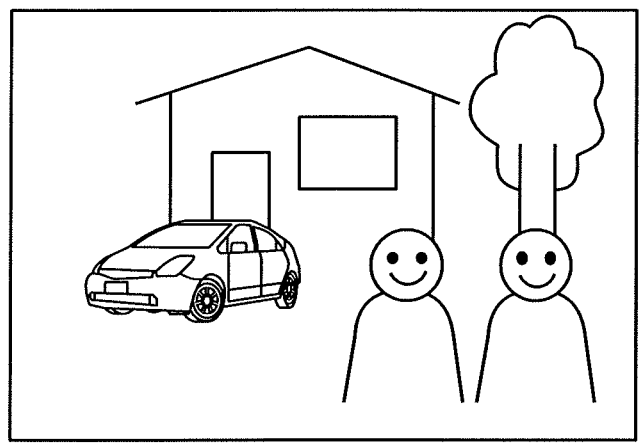
FIGS. 28A, 28B, and 28C are views each showing a refocus image on each refocus plane.

Then, in step S2703, it is determined whether the initial set values read in step S2702 infringe refocus restriction information including stop information and subject distance information. If the initial set values do not infringe the refocus restriction information, the process advances to step S2704, an image processing unit 109 generates a reconstruction image based on the initial set values, and a display unit 110 displays the reconstruction image. FIG. 28A shows a reconstruction image generated at this time. If the initial set values fall within the range of the refocus restriction table, the process advances to step S2705. In the fourth embodiment, initial set values in FIG. 26C fall within a range "f-number of 5.6 and subject distance of up to 3.5 m", which is defined by the refocus restriction table in FIG. 26B. Thus, the process advances to step S2705.

In step S2705, a subject distance represented by the initial set value is compared with a subject distance corresponding to a full aperture value in the refocus restriction table of FIG. 26B. If the subject distance represented by the initial set value is larger, this means that the subject distance does not fall outside the range of the refocus restriction table even if the pseudo-f-number is set to the full aperture value. Therefore, the process advances to step S2706 to adjust the subject distance and f-number. If the subject distance represented by the initial set value is smaller, this means that the subject distance falls outside the range of the refocus restriction table if the pseudo-f-number is decreased. The process thus advances to step S2707 to adjust the pseudo-f-number. For example, a subject distance value represented by an initial set value in FIG. 26C is smaller, compared to "f-number of 2.8 and subject distance of up to 6 m" in the refocus restriction table of FIG. 26B. Hence, the process advances to step S2707.

In step S2706, the image processing unit 109 changes the subject distance and f-number to a settable subject distance and f-number in the refocus range restricted by the refocus restriction information, and then creates a reconstruction image. For example, the subject distance and f-number are changed to settings "f-number of 2 and subject distance of 8 m" stored in the refocus restriction table of FIG. 26B, and a reconstruction image is created.

Figure 28B:
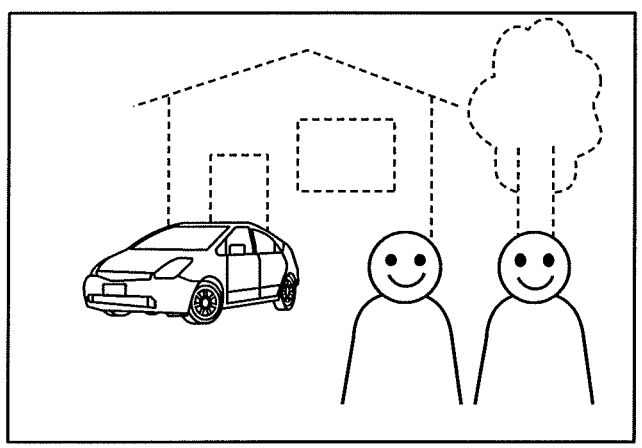

In step S2707, the f-number is changed, and a reconstruction image is created. For example, if the f-number is set to 2.8, the subject distance represented by the initial set value in FIG. 26C falls outside the range of the refocus restriction table. Hence, "f-number of 2.8 and subject distance of 5 m" are set, and a reconstruction image is created. Assume that a reconstruction image shown in FIG. 28B is created. In FIG. 28B, solid lines indicate focused subjects, and broken lines indicate an unfocused subject.

Figure 28C:
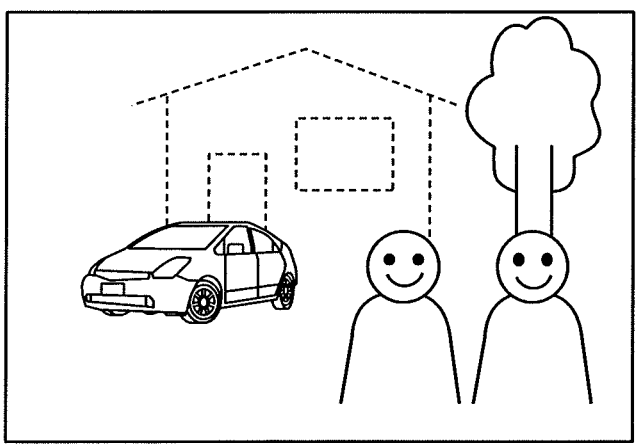

In step S2708, image composition processing is performed. More specifically, first, a subject including the refocus restriction region (x, y) in FIG. 26C is detected from the distance information map. Then, the region of the detected subject is extracted from the reconstruction image in FIG. 28B, and composited into the reconstruction image in FIG. 28A. By performing this processing, an image in which only the refocus restriction region falls outside the depth of field, as shown in FIG. 28C, can be created.

In step S2709, the display unit 110 displays the refocus image.

Finally, in step S2710, it is determined whether to continue the playback mode. If it is determined to continue the playback mode, a refocus instruction is waited in step S2711. If it is determined to end the playback mode, the operation in the image playback mode ends.

The series of playback procedures has been described.

The preferred embodiments of the present invention have been described. However, the present invention is not limited to these embodiments, and can be variously modified and changed without departing from the spirit of the invention.

For example, the subject detection in step S2204 is not limited to the above-described method, and a subject may be detected by extracting a boundary at which the image color abruptly changes, or the accuracy may be increased by combining these methods. Alternatively, it is also possible to arrange a face detection unit, and if the face of a person is recognized, exclude the face from building search targets, thereby increasing the efficiency. In this manner, various modifications are possible, and the present invention is not limited.

As for the reconstruction image creation processing in steps S2706 and S2707, only a region used for composition may be reconstructed on in order to decrease the number of processing steps. Various contrivances are conceivable, and the present invention is not limited to the above-described processing.

There is conceivable a function of, when refocus restriction information is added in step S2210, generating a warning to notify the user of the addition. Various modifications are possible.

The embodiment has explained a building, but the subject is not limited to a building. There is conceivable an embodiment in which, for example, an in-focus inhibition subject database including a character and the face of a person is created on the Internet, and refocus restriction information is added to subjects registered in the database. Various modifications are possible.

In the embodiment, refocus restriction information is added so that privacy information falls outside the depth of field. However, only when privacy information falls outside the depth of field, it may be visually recognized and read. To prevent this, there is conceivable a contrivance in which relation (8) is modified so that privacy information falls outside the range of double the depth of field, and a subject serving as the privacy information is hardly visually recognized from the image. That is, the restriction information is associated with imaging data as information for making it difficult to visually recognize a target subject regardless of generation conditions, thereby restricting generating the reconstruction images such that by executing the refocusing processing. Further, the multiple of the depth of field not to contain privacy information may be changed depending on a building. Various modifications are possible.

Based on information from the GPS 118, it may be determined not to add refocus restriction information in accordance with the type of subject. For example, if it is determined that an image was sensed inside a building or on a popular tourist site, landmark, or the like, no refocus restriction information may be added.

It is readily conceivable that only a main subject can be highlighted by adding refocus restriction information to the range except for the main subject. Various modifications and changes are possible without departing from the spirit of the invention.

[Fifth Embodiment]

The fifth embodiment of the present invention will be described.

Figure 29B:
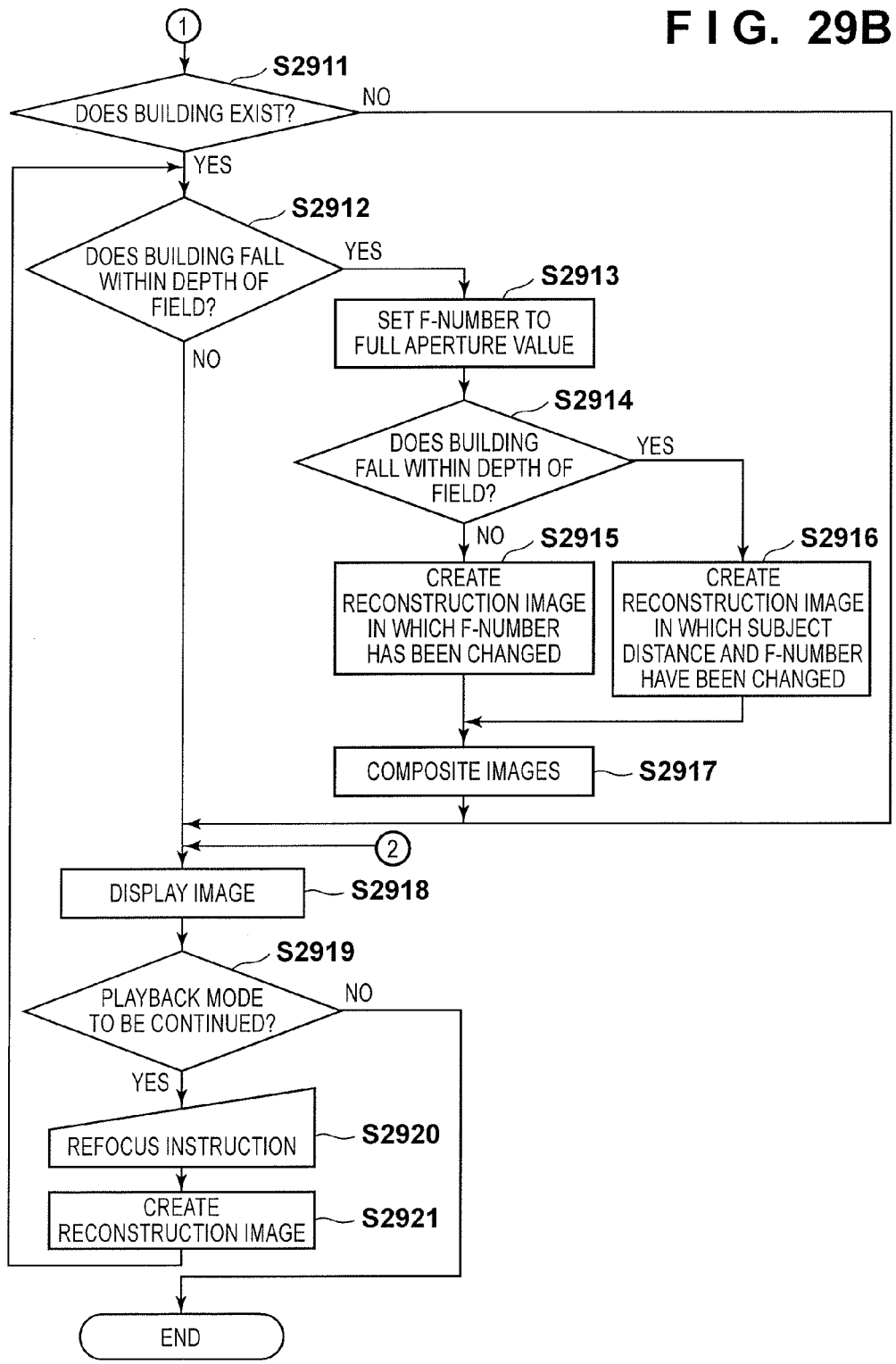

In the fifth embodiment according to the present invention, procedures to calculate a refocus restriction range at the time of image playback for imaging data to which no refocus restriction information has been added, and display an image will be explained with reference to FIGS. 29A and 29B.

First, in step S2901, imaging data stored in a storage medium 111 is loaded. At this time, a light field image may be obtained from an external device by using a communication unit 116, and the imaging data reading method is not limited. Assume that pieces of information about an imaging location and imaging direction are stored in association with imaging data.

Processes in steps S2902 and S2903 are the same as those in steps S2702 and S2703 according to the fourth embodiment, and a description thereof will not be repeated.

Processing of creating a distance information map and performing subject detection in steps S2904 to S2906 is the same as that in steps S2202 to S2204 according to the fourth embodiment, and a description thereof will not be repeated.

In step S2907, it is determined whether one or more subjects have been detected in step S2906. If one or more subjects have been detected, the process advances to step S2908. If no subject has been detected, the process advances to step S2918 to display a reconstruction image on a display unit 110.

Processes in steps S2908 to S2910 are the same those in step S2206 to S2208 according to the fourth embodiment, and a description thereof will not be repeated. In the fourth embodiment, building determination is performed for all detected subjects in step S2910.

If one or more buildings exist in the sensed image in step S2911, the process advances to step S2912. If no building exists, the process advances to step S2918 to display the reconstruction image on the display unit 110.

In step S2912, it is determined whether one or more buildings fall within the depth of field. If the buildings fall within the depth of field, the process advances to step S2913. If no building falls within the depth of field, the display unit 110 displays the reconstruction image in step S2918. The method of calculating the depth of field has been described in the fourth embodiment, and a description thereof will not be repeated.

In step S2913, the pseudo-f-number is set to a full aperture value. Since the full aperture value of the f-number is decided for each image sensing apparatus, the pseudo-f-number is set to the f-number of a settable full aperture value.

In step S2914, the depth of field is calculated based on the set full aperture value of the pseudo-f-number, and it is determined whether one or more buildings fall within the depth of field. If the buildings fall within the depth of field, the process advances to step S2915. If no building falls within the depth of field, the process advances to step S2916.

In step S2915, a reconstruction image is created based on the setting of the full aperture value of the f-number.

In step S2916, the subject distance is changed based on the setting of the full aperture value of the f-number, and a reconstruction image is created. For example, when the initial set values in FIG. 26C are adopted, the f-number is changed to the setting of the full aperture value, the subject distance is also changed to 4 m, and then the depth of field is calculated. When a building falls within the depth of field, the subject distance is changed to 3 m, and the depth of field is calculated. In this way, the subject distance is changed until no building falls within the depth of field. A reconstruction image is created using the calculated set value.

Then, in step S2917, image composition processing is performed. The image composition processing is the same as that in step S2708 according to the fourth embodiment, and a description thereof will not be repeated.

In step S2918, the display unit 110 displays the reconstruction image.

Finally, in step S2919, it is determined whether to continue the playback mode. If it is determined to continue the playback mode, a refocus instruction is waited in step S2920. If it is determined to end the playback mode, the operation in the image playback mode ends. If a refocus instruction is issued, a reconstruction image is created based on designated set values in step S2921. The process then returns to step S2912 to repeat the processing.

The procedures to calculate a refocus restriction range at the time of image playback, and display an image have been described.

[Modification]

Figure 13:
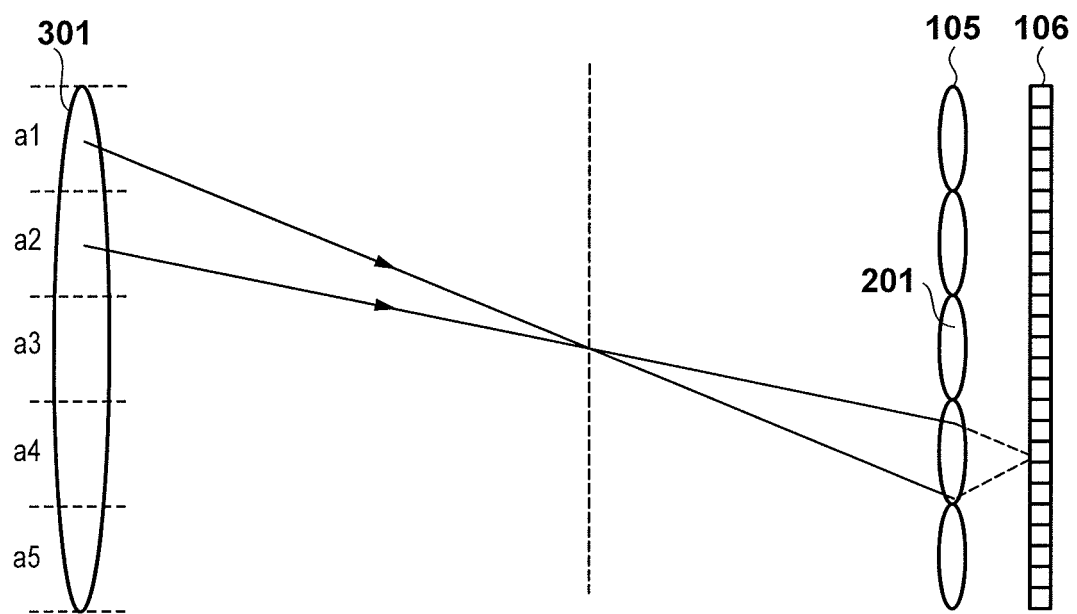
FIG. 13 is a view for explaining the relationship between a light flux having passed through each region of an exit pupil 301, and a photoelectric conversion element which photoelectrically converts the light flux according to a modification of the present invention.

The above-described embodiments target LF data obtained by the arrangement of the imaging optical system 104, microlens array 105, and image sensing unit 106 shown in FIG. 3. However, the present invention may use LF data obtained by an arrangement as shown in FIG. 13. The arrangement in FIG. 13 corresponds to a plenoptic camera described in a literature "Todor Georgiev and Andrew Lumsdaine, 'Superresolution with Plenoptic 2.0 Camera', Signal Recovery and Synthesis, Optical Society of America, 2009". The arrangement in FIG. 13 is different in that the focus of the imaging optical system 104 is formed not on the surface of the microlens array 105, but at a position closer to the exit pupil of the imaging optical system 104.

Figure 14:
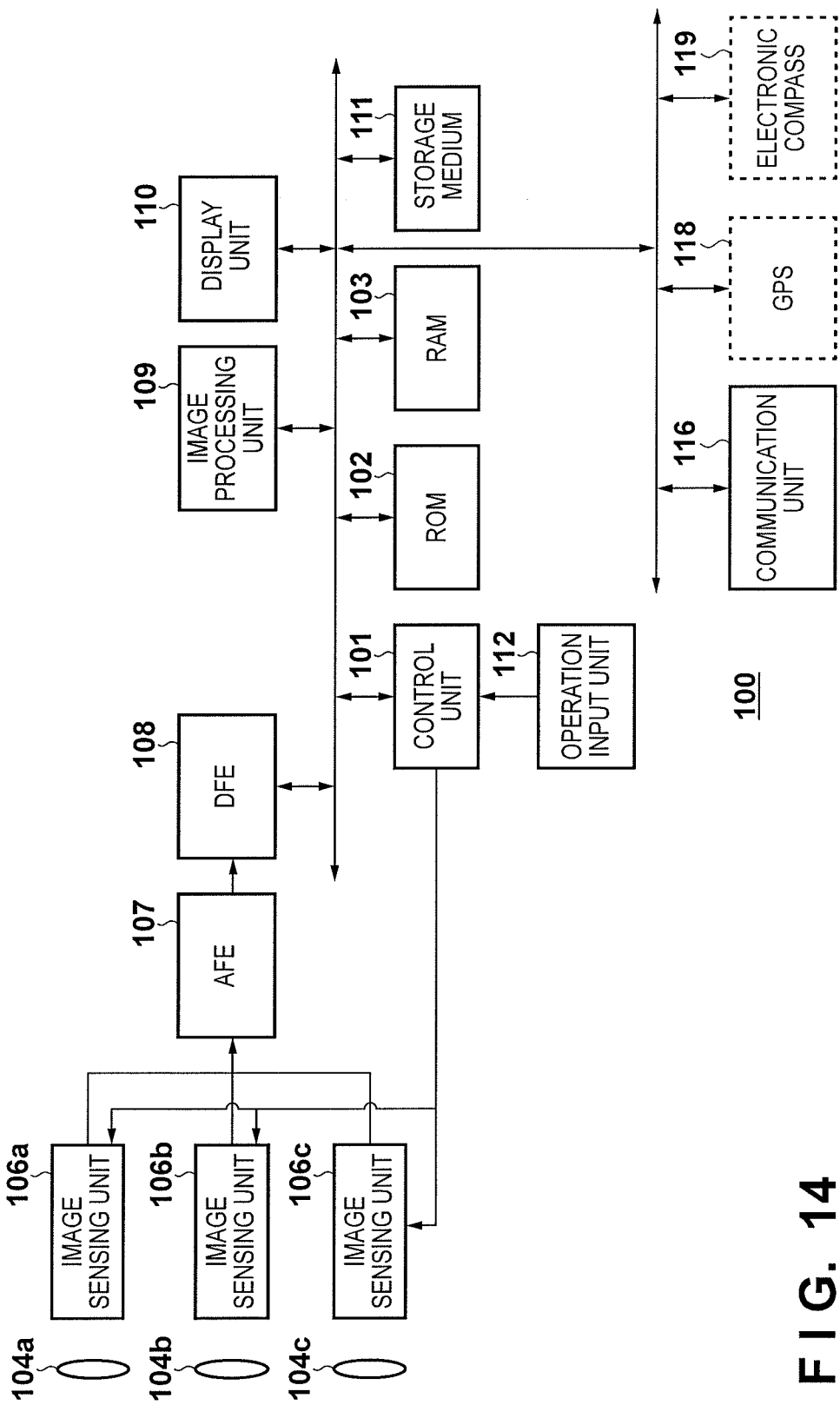
FIG. 14 is a block diagram showing the functional arrangement of a digital camera 100 according to the modification of the present invention.

In the above-described embodiments, a light flux having passed through one imaging optical system 104 is split by the respective microlenses 201, obtaining pixel outputs corresponding to the respective divided pupil regions. However, the practice of the present invention may be implemented by handling, similarly to LF data in the embodiments, a plurality of imaging data obtained by a so-called multi-lens camera including a plurality of optical systems as shown in FIG. 14. That is, outputs from a plurality of image sensors on which optical images are formed through a plurality of optical systems serve as images corresponding to light fluxes having passed through different divided pupil regions, that is, images obtained by imaging a subject from different directions. For this reason, an output from the multi-lens camera is equivalent to LF data in the embodiments. As the method of generating a reconstruction image from such a multi-lens camera, a method disclosed in Japanese Patent Laid-Open No. 2011-022796 or the like is used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-196070 filed Sep. 20, 2013, 2013-195318 filed Sep. 20, 2013, 2013-253638 filed Dec. 6, 2013, 2014-185700 filed Sep. 11, 2014, 2014-185701 filed Sep. 11, 2014, and 2014-185702 filed Sep. 11, 2014, which are hereby incorporated by reference herein in their entirety.

What is claimed is:

1. An image processing apparatus comprising:
an image sensor configured to obtain light field data;
a selection processor configured to select a subject;
a specifying processor configured to specify a region in a reconstruction image that corresponds to the subject selected by the selection processor; and
an output processor configured to output restriction information which is information for not focusing on the subject selected by the selection processor, and is information for restricting reconstruction of the light field data,
wherein as for a generation condition to generate a reconstruction image in which a subject distance obtained for the subject selected by the selection unit falls within a depth of field when the reconstruction image is generated, the output processor sets, to the restriction information, information representing application of predetermined modification processing to the region specified by the specifying processor in the reconstruction image generated based on the generation condition.

2. The apparatus according to claim 1, further comprising a memory configured to store the restriction information output from the output processor in association with the light field data.

3. The apparatus according to claim 1, wherein
the selection processor includes a detection processor configured to detect predetermined subjects for a reconstruction image generable from the light field data, and
the selection processor selects at least some subjects from the predetermined subjects detected by the detection processor.

4. The apparatus according to claim 3, wherein the predetermined subjects include at least one of a face of a person, a character string, and a building.

5. The apparatus according to claim 1, further comprising a distance obtaining processor configured to obtain a subject distance of the subject selected by the selection processor,
wherein the output processor generates the restriction information based on the subject distance obtained by the distance obtaining processor for the subject selected by the selection processor.

6. The apparatus according to claim 5, wherein
the restriction information includes a generation condition for generating a reconstruction image from the light field data, and
the output processor sets, in the restriction information, a generation condition in which the subject distance obtained for the subject selected by the selection processor falls within a depth of field when the reconstruction image is generated.

7. The apparatus according to claim 6, wherein the generation condition in the restriction information is a condition which is excluded when generating a reconstruction image from the light field data.

8. The apparatus according to claim 6, wherein the generation condition to generate the reconstruction image includes information of at least one of a pseudo-stop state and a focusing subject distance in a reconstruction image.

9. The apparatus according to claim 1, wherein the selection processor specifies a geographical point of an image sensing apparatus, which shot the light field data, and selects the subject based on information associated with the geographical point, where the information is received from an external apparatus.

10. The apparatus according to claim 9, wherein the information associated with the graphical point is information specifying the type of subject and including information indicating at least one of a building, a landmark and a tourist site.

11. The apparatus according to claim 9, wherein the information associated with the graphical point includes information indicating whether the subject is an in-focus inhibition subject or not.

12. The apparatus according to claim 1, wherein in the light field data, respective pixel signals represent signal strengths corresponding to light fluxes different in a combination of an incident direction, and a pupil region of an imaging optical system through which the light flux has passed.

13. The apparatus according to claim 1, wherein the light field data is light field information describing a three-dimensional subject field.

14. An image processing apparatus comprising:
an image sensor configured to obtain light field data;
an information obtaining processor configured to obtain restriction information for not focusing on a specific subject for a reconstruction image generable from the light field data;
a setting processor configured to set a generation condition of a reconstruction image to be generated from the light field data; and
a decision processor configured to decide, based on the generation condition set by the setting processor and the restriction information, a generation condition of a reconstruction image to be finally generated,
wherein a generation condition included in the restriction information is a condition which is excluded when generating a reconstruction image from the light field data.

15. The apparatus according to claim 14, further comprising a generation processor configured to generate a reconstruction image from the light field data based on the generation condition decided by the decision processor.

16. The apparatus according to claim 14, wherein
the restriction information includes a generation condition for generating a reconstruction image from the light field data, and
when the generation condition set by the setting processor is the generation condition included in the restriction information, the decision processor decides a generation condition different from the generation condition set by the setting processor.

17. The apparatus according to claim 14, wherein when the generation condition set by the setting processor is the condition to be excluded, the decision processor decides, as a new generation condition, a generation condition not included in the restriction information.

18. The apparatus according to claim 17, wherein
the condition to be excluded defines at least information of a range of a focusing subject distance, and
when the generation condition set by the setting processor is the condition to be excluded, the decision processor sets, in the new generation condition, a subject distance outside a range of a focusing subject distance that is defined by the condition to be excluded.

19. The apparatus according to claim 17, wherein
the condition to be excluded defines information of a range of a focusing subject distance for each of a plurality of pseudo-stop states, and
when the generation condition set by the setting processor is the condition to be excluded, the decision processor decides the new generation condition other than the condition to be excluded, by changing at least one of a stop state and a focusing subject distance in the generation condition set by the setting processor.

20. The apparatus according to claim 14, wherein in the light field data, respective pixel signals represent signal strengths corresponding to light fluxes different in a combination of an incident direction, and a pupil region of an imaging optical system through which the light flux has passed.

21. The apparatus according to claim 14, wherein the light field data is light field information describing a three-dimensional subject field.

22. An image processing method comprising:
a signal obtaining step of obtaining light field data;
a selection step of selecting a subject;
a specifying step of specifying a region in a reconstruction image that corresponds to the subject selected in the selection step; and
an output step of outputting output restriction information for outputting restriction information which is information for not focusing on the subject selected in the selection step, and is information for restricting reconstruction of the light field data,
wherein as for a generation condition to generate a reconstruction image in which a subject distance obtained for the subject selected in the selection step falls within a depth of field when the reconstruction image is generated, information representing application of predetermined modification processing to the region specified in the specifying step in the reconstruction image generated based on the generation condition is set to the restriction information in the output step.

23. An image processing method comprising:
a signal obtaining step of obtaining light field data capable of generating reconstruction images focused on a plurality of subject distances;
an information obtaining step of obtaining restriction information for not focusing on a subject for a reconstruction image generable from the light field data;
a setting step of setting a generation condition of a reconstruction image to be generated from the light field data; and
a decision step of deciding, based on the generation condition set in the setting step and the restriction information, a generation condition of a reconstruction image to be finally generated,
wherein a generation condition included in the restriction information is a condition which is excluded when generating a reconstruction image from the light field data.

24. A computer-readable non-transitory storage medium storing a program for causing a computer to execute the following steps:
a signal obtaining step of obtaining light field data;
a selection step of selecting a subject;
a specifying step of specifying a region in a reconstruction image that corresponds to the subject selected in the selection step; and
an output step of outputting output restriction information for outputting restriction information which is information for not focusing on the subject selected in the selection step, and is information for restricting reconstruction of the light field data,
wherein as for a generation condition to generate a reconstruction image in which a subject distance obtained for the subject selected in the selection step falls within a depth of field when the reconstruction image is generated, information representing application of predetermined modification processing to the region specified in the specifying step in the reconstruction image generated based on the generation condition is set to the restriction information in the output step.

25. A computer-readable non-transitory storage medium storing a program for causing a computer to execute the following steps:
    a signal obtaining step of obtaining light field data capable of generating reconstruction images focused on a plurality of subject distances;
    an information obtaining step of obtaining restriction information for not focusing on a subject for a reconstruction image generable from the light field data;
    a setting step of setting a generation condition of a reconstruction image to be generated from the light field data; and
    a decision step of deciding, based on the generation condition set in the setting step and the restriction information, a generation condition of a reconstruction image to be finally generated,
    wherein a generation condition included in the restriction information is a condition which is excluded when generating a reconstruction image from the light field data.

26. An image processing apparatus comprising:
    an image sensor configured to obtain light field data;
    a selection processor configured to select a subject;
    a specifying processor configured to specify a region in a reconstruction image that corresponds to the subject selected by the selection processor; and
    an output processor configured to output restriction information which is information for making visibility of the subject selected by the selection processor, lower regardless of a generation condition in reconstructing, and is information about a reconstruction image generated by reconstructing the light field data,
    wherein as for a generation condition to generate a reconstruction image in which a subject distance obtained for the subject selected by the selection processor falls within a depth of field when the reconstruction image is generated, the output processor sets, to the restriction information, information representing application of predetermined modification processing to the region specified by the specifying processor in the reconstruction image generated based on the generation condition.

27. An image processing apparatus comprising:
    an image sensor configured to obtain light field data;
    an information obtaining processor configured to obtain restriction information for making visibility of a subject, lower regardless of a generation condition in reconstructing, for a reconstruction image generable from the light field data;
    a setting processor configured to set a generation condition of a reconstruction image to be generated from the light field data; and
    a decision processor configured to decide, based on the generation condition set by the setting processor and the restriction information, a generation condition of a reconstruction image to be finally generated,
    wherein a generation condition included in the restriction information is a condition which is excluded when generating a reconstruction image from the light field data.

28. An image processing apparatus comprising:
    an image sensor configured to obtain light field data;
    a selection processor configured to select a subject; and
    an output processor configured to output restriction information which is information for not focusing on the subject selected by the selection processor, and is information for restricting reconstruction of the light field data, and
    wherein the selection processor specifies a geographical point of an image sensing apparatus, which shot the light field data, and selects the subject based on information associated with the geographical point, where the information is received from an external apparatus, and
    the information associated with the graphical point includes information indicating whether the subject is an in-focus inhibition subject or not.

29. An image processing method comprising:
    a data obtaining step for obtaining light field data;
    a selection step of selecting a subject; and
    an output step of outputting restriction information which is information for not focusing on the subject selected by the selection unit, and being information for restricting reconstruction of the light field data, and
    wherein in the selection step, a geographical point of an image sensing apparatus, which shot the light field data, is specified and the subject is selected based on information associated with the geographical point, where the information is received from an external apparatus, and
    the information associated with the graphical point includes information indicating whether the subject is an in-focus inhibition subject or not.

30. A computer-readable non-transitory storage medium storing a program for causing a computer to execute the following steps:
    a data obtaining step for obtaining light field data;
    a selection step of selecting a subject; and
    an output step of outputting restriction information which is information for not focusing on the subject selected by the selection unit, and being information for restricting reconstruction of the light field data, and
    wherein in the selection step, a geographical point of an image sensing apparatus, which shot the light field data, is specified and the subject is selected based on information associated with the geographical point, where the information is received from an external apparatus, and
    the information associated with the graphical point includes information indicating whether the subject is an in-focus inhibition subject or not.

* * * * *